United States Patent [19]

Nishizawa

[11] 3,871,764

[45] Mar. 18, 1975

[54] PATTERN GENERATOR APPARATUS

[76] Inventor: Junichi Nishizawa, No. 6-5, Tsuchitoi 1-chome, Sendai, Japan

[22] Filed: Nov. 8, 1972

[21] Appl. No.: 304,841

[30] Foreign Application Priority Data

| | | |
|---|---|---|
| Apr. 5, 1972 | Japan | 47-34229 |
| Apr. 5, 1972 | Japan | 47-34230 |
| Apr. 11, 1972 | Japan | 47-36295 |
| Apr. 13, 1972 | Japan | 47-38095 |
| Apr. 13, 1972 | Japan | 47-38096 |
| Apr. 13, 1972 | Japan | 47-38097 |
| Apr. 13, 1972 | Japan | 47-38098 |
| Apr. 17, 1972 | Japan | 47-38499 |

[52] U.S. Cl. .......... 355/18, 354/4, 355/40

[51] Int. Cl. .......... G03b 27/50

[58] Field of Search .......... 355/40–46, 355/18; 354/4, 5, 10

[56] References Cited

UNITED STATES PATENTS

| | | | |
|---|---|---|---|
| 3,323,414 | 6/1967 | Ritchie et al. | 355/43 X |
| 3,330,182 | 7/1967 | Gerber et al. | 354/4 |
| 3,434,402 | 3/1969 | McCall | 354/5 X |
| 3,648,583 | 3/1972 | Blattner | 354/4 |
| 3,703,858 | 11/1972 | La Canfora | 354/4 |
| 3,704,946 | 12/1972 | Brault et al. | 355/46 |
| 3,732,796 | 5/1973 | Marcy | 354/4 |

*Primary Examiner*—Richard A. Wintercorn

[57] ABSTRACT

Pattern generator apparatus is disclosed, comprising a printing light source, a predetermined pattern, an optical lens system including a zoom lens and a reduction lens, and a sensitive surface. The magnification of the optical lens system is made variable and the pattern is formed on the sensitive surface while being reduced. This apparatus also provides a focal position detecting device comprising first and second half mirrors which are disposed between the zoom lens and the reducing lens of the optical lens system. In operation, a focusing pattern projected from a light source is reflected and refracted by the first half mirror to be focused into an image on the sensitive surface, and the reflected light from the sensitive surface is reflected and refracted by the second half mirror to be condensed onto a measuring element. The focal position detecting device further includes a printing light source which is lighted when the projected pattern is brought in focus. The optical reducing lens exposure system and an electron beam exposure system are used in combination to provide for enhanced resolution and shortened time of exposure.

15 Claims, 34 Drawing Figures

PATTERN GENERATOR APPARATUS

BACKGROUND OF THE INVENTION

1. Field of the Invention

This invention relates to pattern generator apparatus, and more particularly to such apparatus for making a photomask and printing a pattern on a semiconductor wafer in the fabrication of transistors, integrated circuits (IC) and large-scale integrated circuits (LSI), and the like with extremely high precision as compared with the prior art.

2. Description of the Prior Art

With reference to FIGS. 1A, 1B and 1C, a descripption will be given of a known method of making a pattern as employed in the manufacture of semiconductor devices, for example, integrated circuits. In FIG. 1A, reference numeral 1 indicates an "original". At first, the "original" 1 is formed and then projected through a lens 2 onto a sensitive surface such as a dry plate 3 to form a pattern thereon. In turn, light is projected through the developed dry plate and focused by a lens 4 onto a second dry plate 5 to form a pattern thereon. This process is repeated further to obtain the desired reduction in image. The second pattern thus obtained is the so-called photomask, which is closely contacted with a semiconductor, for example, silicon, coated with a photosensitive emulsion such as, for example, KPR and is then exposed to irradiation by parallel rays of light sensitizing KPR, thus effecting the so-called contact printing.

However, such a conventional method involves the formation of the original, the projection of the original pattern onto the dry plate 3 through a lens 2, further projection of the pattern formed on the dry plate 3 onto the dry plate 5 through the lens 4 and the contact printing of the pattern formed on the dry plate 5 onto the surface of the semiconductor body 6. Accordingly, the making of each dry plate requires exposure, development and printing processes and this causes expansion and contraction of the emulsion to result in a decrease in the accuracy of the pattern and the surface of the pattern is stained by the contact printing.

Further, one of the factors determining resolution of the pattern is blooming due to the lenses. The lens blooming and that due to the dry plate exert an accumulative, negative influence on the formation of the pattern, so that the accuracy of the final pattern is lowered further thereby. Namely, prior pattern generator apparatus requiring precise focusing adjustment employ typically pneumatic pressure, directed through a nozzle. However, adiabatic expansion causes a temperature drop of the air on the side of the nozzle, thereby introducing errors in the dimension of the high resolution dry plates and the silicon wafer and making precise focusing very difficult. Further, the use of pneumatic pressure necessitates the provision for dehumidification and dust removing, and accordingly the apparatus become inevitably bulky. In addition, conventional apparatus do not correct for possible errors in the gap between the nozzle and the dry plate, thereby rendering such apparatus difficult to use when the depth of the focus of the lens used is less than $4\mu$.

SUMMARY OF THE INVENTION

It is therefore an object of this invention to form patterns of reduced size onto sensitized surfaces such as photoresist that may be placed upon a semiconductor body.

It is a further object of this invention to eliminate the need of forming a plurality of originals of successively reduced dimensions to achieve a final pattern of substantially reduced dimension.

In accordance with these and other objects, this invention provides pattern generator apparatus for directing a beam of light from a source through a suitable pattern determining means to provide a light image corresponding to the pattern, and an optical assembly including a zoom or variable focal length lens for varying the degree of magnification of the light image and a reducing lens for reducing the size of the light image and for directing the light image onto the sensitized surface whereby a pattern of significantly reduced dimension is formed thereon.

As a further object of this invention, the generator apparatus includes a focal position detecting means for rapidly and accurately detecting the focal position of the lens system by vibrating one of the zoom lens or reducing lens at relatively high frequency.

In a further aspect of this invention, electromagnetic means provided for varying the magnification of the zoom or variable focal length lens. In a still further aspect of this invention, the pattern generator apparatus includes means for providing an aperture of variable configuration through which the light image is directed. Additionally, the generator apparatus of this invention employs focus detecting means adapted to derive a differential value of the light distribution of the focused pattern, including a light measuring element that is adapted to move relative to the object to be photographed.

In a still further aspect of this invention, the pattern generator apparatus as described above, includes an electron beam exposure system whereby a beam of electrons is scanned or moved in a defined pattern to form in combination with the focused light image (as derived above) a composite image or pattern upon the sensitized surface.

BRIEF DESCRIPTION OF THE DRAWINGS

While the specification concludes with claims particularly pointing out and distinctly claiming the subject matter which is regarded as the invention, preferred embodiments are disclosed in the following detailed description taken in conjunction with the accompanying drawings, in which:

DESCRIPTION OF THE PREFERRED EMBODIMENTS

Figure 1A:
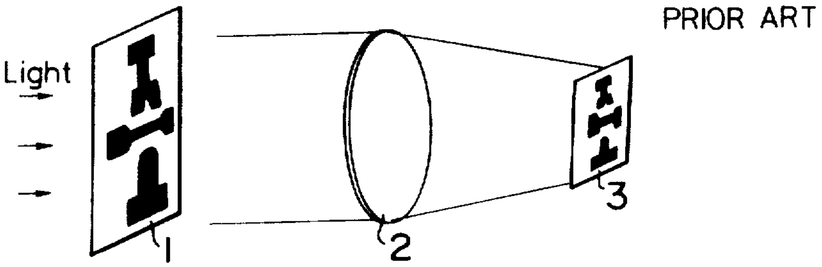
FIGS. 1A, 1B and 1C are diagrams showing apparatus of the prior art for generating images.
Figures 1B, 1C:
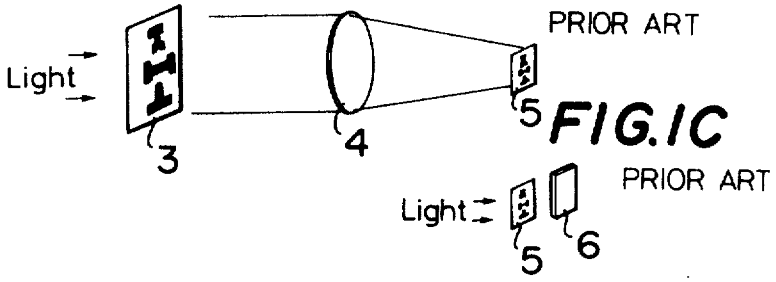

As previously described, FIG. 1 is a diagram, for explaining a pattern generator of the prior art.

Figure 2:
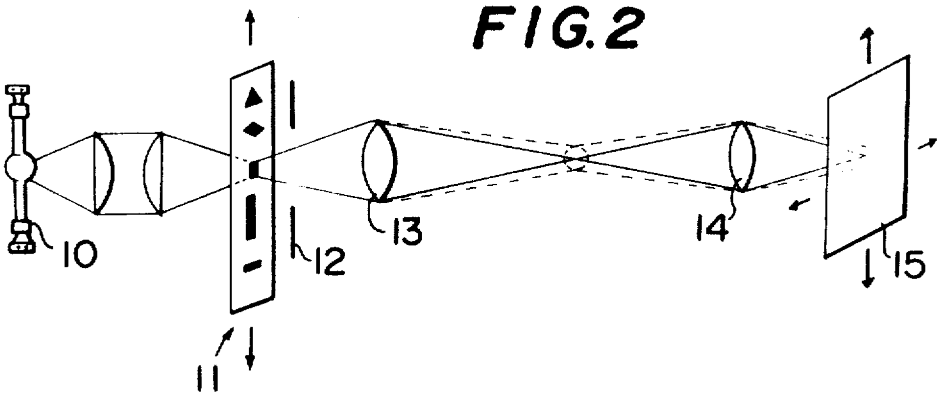
FIG. 2 is a diagram for explaining the principle of this invention.

FIG. 2 is a diagram for explaining the principle of the present invention. In FIG. 2, reference numeral 10 indicates a light source, numeral 11 refers to a master reticle, numeral 12 identifies an iris mechanism, numeral 13 refers to a zoom lens, numeral 14 identifies a reducing lens and numeral 15 indicates a dry plate. In the present invention, some images on which final patterns are based can be obtained by changing the master reticle 11. Also, it is possible to obtain various basic images or figures by using means for changing the angle of the master reticle 11 in a plane vertical to an optical axis and the angle of the dry plate or a wafer support to a direction of its movement to simplify blacking-out of the figures over wide areas. By changing the magnification of the basic figures by the zoom lens 13, patterns of desired sizes can be formed on the dry plate or a wafer 15. It is advantageous to use the iris mechanism 12 for the formation of patterns such as a dot, a line, a square and the like, so that the advantages of this invention would be further exhibited if at least two of such patterns should be used together in combination. In this case, correction of the brightness of the images, which is varied with the change of the magnification of the zoom lens 13, is effected by altering the intensity of light of an exposing light source or the time for exposure. The replacement of the basic images or figures, the actuation of the opening and closing of a shutter, the adjustment or zooming of the lens 13, and the movement of the dry plate or the wafer support, which become necessary as a result of the replacement of the figures, can be achieved under the control of an electronic computer.

This invention generates patterns of higher accuracy than the prior art and provides patterns of desired size by the use of the zoom lens, as described above. Accordingly, it is unnecessary to make many large patterns of different scales unlike the prior art, and hence the number of processes involved can be reduced. Further, the use of the zoom lens does not necessitate changing the size of the master reticle in accordance with the change of the magnification which is required in the prior art, and patterns of different scales can be obtained without changing the positions of the aperture, the lens and the dry plate relative to each other.

The most important feature of this invention resides in that the patterns can be formed with high precision. The term "precision" as used herein includes accuracy of the physical dimension of the pattern and its resolution, that is, the so-called contrast; since the prior art method involves the repeated steps of exposure, development and printing for the making of a series of dry plates as referred to previously, the accuracy of the pattern is lowered but the present invention does not use a plurality of such steps, so that the accuracy of the pattern is maintained.

The principles of the present invention have been explained briefly, but the invention exhibits excellent performance with the use of additional devices to be described below.

Figure 3:
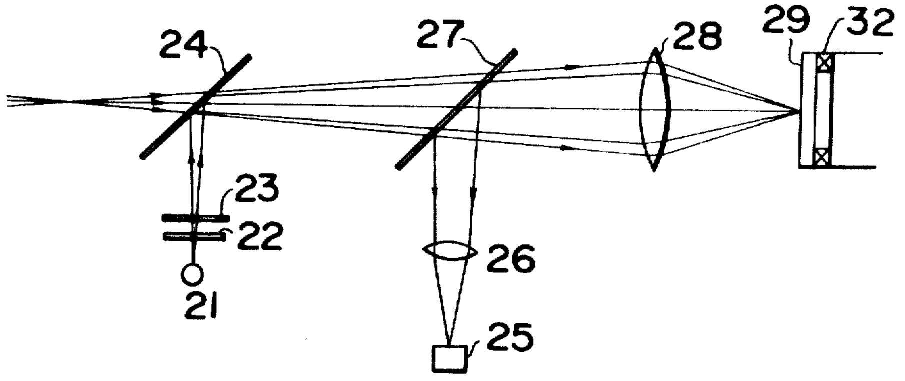
FIGS. 3, 4 and 5 are schematic diagrams for explaining a focusing adjustment mechanism of this invention apparatus.
Figures 4, 5:
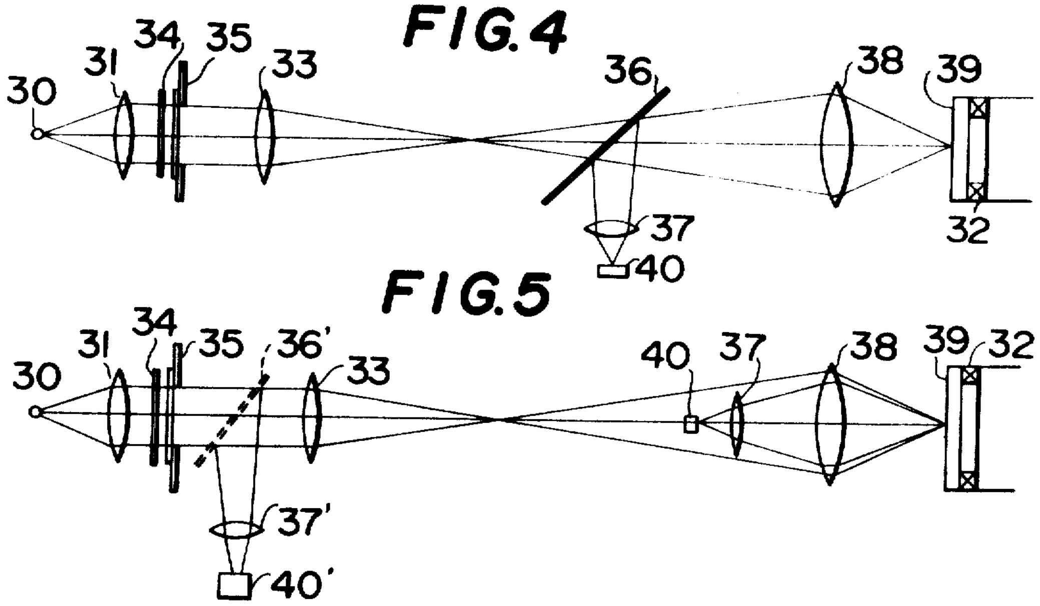

FIGS. 3, 4 and 5 schematically illustrate embodiments of this invention provided with a focusing device.

In FIG. 3, this embodiment includes a light source 21 for the purpose of focusing, and first and second half mirrors 24 and 27. The light source 21 is a suitable white lamp such as a mercury-arc lamp, or a luminescent diode. The light emanating from the light source 21 passes through a filter 22, to eliminate those wavelengths of light to which a photosensitive surface 29 is sensitive. The light having passed through the filter 22 further passes through a pattern 23 to be directed onto the first half mirror 24, whereby the image is reflected and refracted through 90°. Subsequently, the image passes through the second half mirror 27 and a reducing lens 28 to be focused finally on the photosensitive surface 29. One portion of the light incident on the photosensitive surface 29 is reflected thereby back to the reducing lens 28 and is reflected and refracted by the second half mirror 27 through 90° to be collected by a condensing lens 26. The condensing lens 26 may be left out where the distance between the second half mirror 27 and a measuring element 25 is large. The projected pattern focused by the lens 26 is directed onto the measuring element 25 to detect the focus of the pattern. In the present example, each of the focusing light source 21, the filter 22 and the focusing pattern 23 can be used to perform the function of the other members, so long as it serves its respective purpose. For example, in the case of using a luminescent diode, if the photosensitive material used is not sensitized readily by the light emanating from the focusing light source 21, the filter 22 may be removed. Further, if a pattern to be ultimately printed is used as the focusing pattern 23, none of the filter 22, the focusing pattern 23 and the focusing light source 21 is necessary.

FIG. 4 shows the cause in which a printing light source 30 and a printing pattern 35 are used as the focusing light source and the focusing pattern. Reference numeral 30 designates the light source for printing, 31 a condensing lens and 33 a zoom lens. The light emitted from the light source 30 passes through a filter 34, the pattern 35 for printing, the zoom lens 33 and a half mirror 36, and enters a reducing lens 38 to be focused onto a sensitive surface 39. In turn, the image is reflected thereby back to pass through the reducing lens 38 and enter the half mirror 36 to be reflected thereby and refracted through 90° towards a condensing lens 37, which projects the image onto a measuring element 40, thus detecting the focus of the projected pattern. The above-mentioned pattern 35 for printing may be formed with a variable aperture or a master reticle. This system is suitable for use in the case where the time for sensitization is long. Also, it is possible to perform the detecting of the focus by projecting a specific pattern on an unnecessary area of the sensitive surface at all times. The method shown in FIG. 4 is an example which does not employ the light source and pattern for focusing but uses the light source 30 and the printing pattern 35 as they are, for the purpose of focus detection. In the case where the time for sensitization is short, the filter 34 is disposed in position for focusing at the time of focusing and is removed at the time of printing, after which exposure is effected.

FIG. 5 shows the case in which the focusing device is placed in the optical axis for printing. Also, in the illustrated example of FIG. 5, the light emanating from the light source 30 passes through the filter 34, the pattern 35, the zoom lens 33 and the reducing lens 38 onto the sensitive surface 39. The reflected image is condensed by the condensing lens 37 to be projected onto the measuring element 40, thus detecting the focus. It is also possible to direct the reflected image by a mirror 36′ through a condensing lens 37′ onto a measuring element 40′ as indicated by a broken line. In this example, the condensing lens 37′ and the measuring element 40′ are provided forwardly of the zoom lens 33 and they may also be located in the neighborhood of the printing light source 30.

The system described above has an advantage that defocusing or blooming resulting from changing the zoom ratio or the like can also be corrected. Of course, the systems of FIG. 4 and 5 may be combined together.

The following will describe a mechanism in accordance with this invention for the vibration of the sensitive surface. The sensitive surface is indicated by numeral 29 in FIG. 3 and by numeral 39 in FIGS. 4 and 5. The sensitive surface is vibrated by a vibrator 32 at a high frequency when the pattern (indicated by numeral 23 in FIG. 3 and by numeral 35 in FIGS. 4 and 5) is focused into an image on the sensitive surface. The sensitive surface cannot be perfectly smooth. For example, if the sensitive surface is the surface of a dry plate of superhigh resolution, unevenness of the dry plate is approximately 12 microns and this implies the requirement that correction be made down to at least 12 microns or more. To perform this, the dry plate is vibrated in a direction to bring the pattern into focus on the dry plate; in other words, the dry plate is vibrated about a position where the pattern is focused, so that a maximum intensity of light is ultimately directed onto the central area of the dry plate. Thus, the position of the focus corresponds to the maximum light intensity. Namely, it is necessary to vibrate the dry plate and correct its position. Alternatively, as will be described in detail later, a mechanism may be provided for vibrating at least one part of the lens system or the sensitizing system (including a photoelectric conversion element, of source), so that the focal position also shifts.

The projected pattern reflected by the sensitive surface passes through the reducing lens, enters the half mirrors 27 or 36 to be reflected or refracted through 90° toward the condensing lenses 26 and 37 which focus the image onto the measuring element, as previously described in connection with FIGS. 3 and 4 respectively. In this case, by causing the projected pattern to be incident on the measuring element in such a manner that the border of light and darkness of the pattern crosses the measuring element, it is possible to detect the focal position by reading the differential value of the output of the measuring element.

Figures 6, 7, 9A:
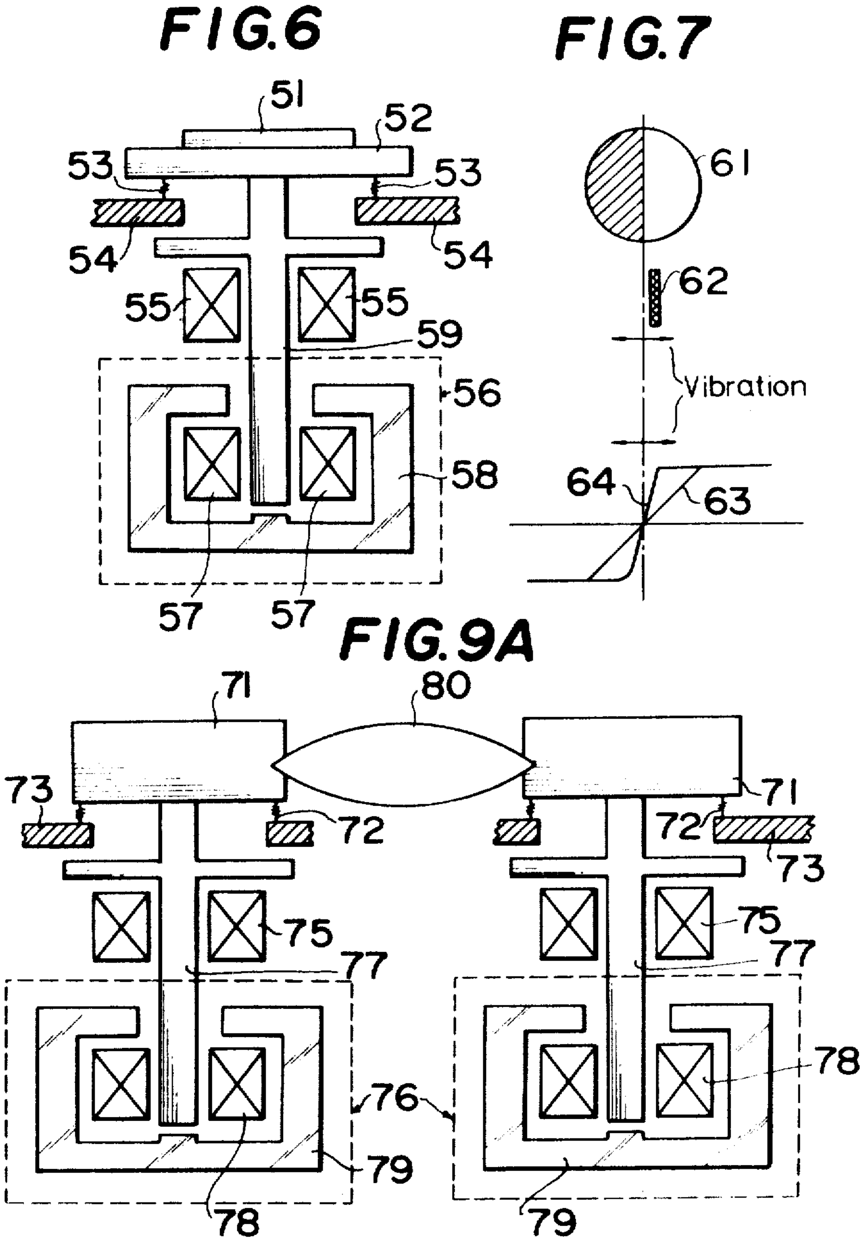
FIG. 6 shows one example of means for vibrating a photosensitive surface in accordance with this invention.
FIG. 7 is a schematic diagram for explaining the principle of focusing in accordance with this invention.
FIG. 9A illustrates one example of means for vibrating the lens system of the subject invention.

The vibration may be effected by means of an electromagnet, electrostrictive or magnetostrictive element. FIG. 6 illustrates one example of a suitable vibrating means employing an electromagnet. In the illustrated example, a sensitive surface 51 is fixed on a support 52, which is, in turn, mounted by means of springs 53 on a stationary base 54. On a shaft 59 projecting from the support 52 there are mounted an electromagnet 55 for vibration and an electromagnetic braking device 56. Control with a detecting device is maintained at all times, for example, by superimposing controlled amplitudes of a DC current on an AC current to be applied to the coil of the electromagnet 55. In this manner, the center of vibration of support 52 and the focal position can be brought always to the center of the amplitude, so that when the vibration is stopped the projected pattern is in focus, and accordingly focusing can be achieved with ease. Another method is such that an original of, for example, a striped pattern is vibrated about the position of the master reticle or the effective position of a light source of, for example, red color light, and the focus is detected by reflected light of the projected image. Needless to say, an error in the wavelength is previously corrected in this case and the lens may also be vibrated.

Next, a braking method therefor will be described. The above-mentioned electromagnetic braking device 56 comprises a coil 57 and a fixed iron core 58. When a shaft 59 is vibrated by the electromagnet 55, a voltage is induced in the coil 57. Connecting the voltage induced across the coil 57 to collector and emitter terminals of a transistor circuit (not shown), a current flows to the base which is connected to the coil 57. Magnetic flux induced by this current in the coil 57 varies in a direction reverse to that mentioned above to produce a braking force in a direction to stop the vibrating magnet at all times. This braking force is in proportion to the current flow, so that a desired braking force can be obtained by controlling the current with the transistor. Namely, the braking force can be controlled by controlling the transistor circuit so that, in the case of starting the vibration, the current may not flow and that, in the case of stopping the vibration, the current may increase. This system can be used also for vibrating the lens system.

Figure 8A:
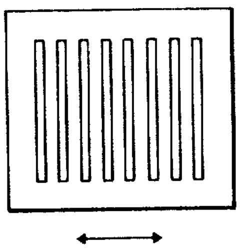
FIGS. 8A and 8B show examples of detecting patterns for use in the apparatus of this invention.
Figure 8B:
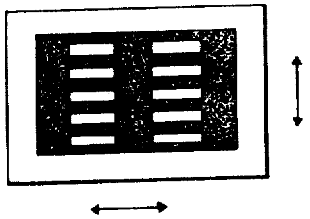

With regard to FIG. 7, the focus detection in the measuring element is carried out in the following illustrative manner. First, a pattern of a light-receiving element 62 and a projected pattern 61 are directed to cross the border of light and darkness of the patterns relative to each other as shown in FIG. 7. When the projected pattern 61 is out of focus, the gradient of light and darkness is dull as indicated by a curve 63 and when the projected pattern is in focus, the gradient is sharp as indicated by a curve 64. Accordingly, the degree of focusing can be detected by detecting the gradient of defocusing or blooming, that is, the differential value of the curve (63 or 64). The detecting pattern may be a striped pattern as depicted in FIG. 8A to provide for enhanced sensitivity in detecting, or may be of a checkered pattern for detecting both rough and precise focusing. Further, the detecting pattern may be such as shown in FIG. 8B, comprising a pattern of wide spacings for rough focusing detection and that of narrow spacings for precise focusing detection. In practical detection, these patterns are vibrated in directions of the arrows, respectively.

A lens vibration mechanism will hereinbelow be described. As depicted in FIG. 9A, this mechanism illustratively comprises an electromagnetic control lens system for focusing and alteration of the magnification of an optical member by vibrating the optical member by means of a vibrating mechanism similar to that described previously in connection with FIG. 6. In FIG. 9A, a lens 80 is supported by lens holders 71, which are, in turn, mounted by means of springs 72 on stationary plates 73. About each shaft 77 of the lens holders 71, there are disposed an electromagnet 75 for vibration and an electromagnetic braking device 76. Their modes of vibration are the same as described previously in connection with FIGS. 6 and 7, and the focal position of the lens can be detected rapidly and accurately. Of course, when parallelism is ensured, the drive system may be one. In this vibration mechanism, it is also possible to vibrate not only the lens, but also one part of a lens used in combination therewith.

Figure 9B:
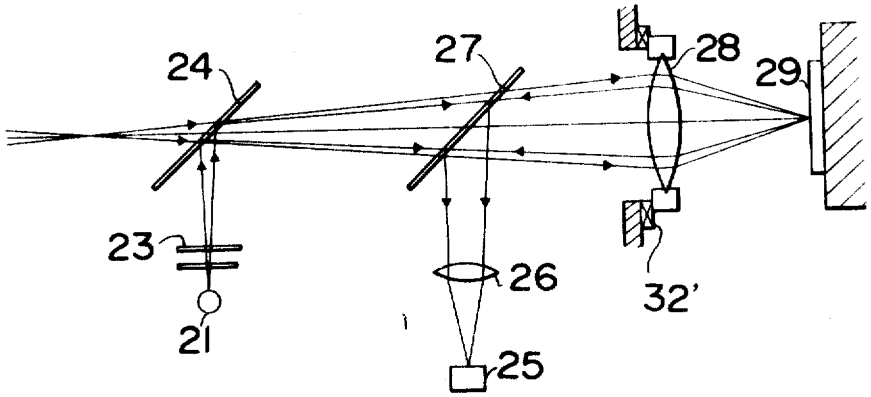
FIG. 9B is a diagram for explaining the operation of the optical system when the vibrating means of FIG. 9A is incorporated in the apparatus of this invention.

FIG. 9B shows a vibration mechanism 32' in which the reducing lens 28 of the focusing device depicted in FIG. 3 is vibrated by means of a single lens drive system. Accordingly, the construction of each part of the mechanism is exactly identical with that shown in FIG. 3 and its detail construction will also be seen in FIG. 3. The present example is different from that of FIG. 3 in that the sensitive surface 29 is fixed and in that the reducing lens 28 is electromagnetically vibrated. In FIG. 9B, the projected pattern for focusing purposes passes through the first half mirror 24 and then enters the electromagnetically vibrated reducing lens 28. At this time, the reducing lens 28 is being vibrated by the vibrator 32' at high frequency. The light having passed through the reducing lens 28 is focused into an image on the sensitive surface 29. The sensitive surface 29 cannot be a perfectly flat plane and if, for example, a dry plate of superhigh resolution is used as the sensitive surface 29, the unevenness of the dry plate is about 12$\mu$. Energizing the vibrator 32' to vibrate at an amplitude of more than 12 microns, the electromagnetically controlled lens 28 is also vibrated at an amplitude of more than 12$\mu$, so that it will necessarily cross the focus position at a certain instant. The projected pattern reflected back by the sensitive surface 29 passing through the electromagnetically vibrated reducing lens 28 and is reflected and refracted by the second half mirror 27 through 90°, onto the condensing lens 26 to be projected thereby onto the measuring element 25. The focusing can be effected by causing the border of light and darkness of the pattern to cross the measuring element 25 and by reading its differential value, as explained above with regard to FIG. 7. Namely, while the reducing lens 28 is being vibrated, the light image will be focused and defocused alternately with respect to the sensitive surface 29. As the image approaches a focused condition on the sensitive surface 29, the output detected by the measuring element 25 gradually increases. When the image is in focus upon the sensitive surface 29, the detected output reaches its maximum value, and as the image goes out of focus, the output of element 25 becomes attenuated. Consequently, the focal position can be detected by the detection of the maximum value.

The vibration may be achieved with an electromagnet, an electrostrictive or magnetostrictive element as described previously. By continuous control with the detecting device, the focal position of the lens can be disposed at a position corresponding to the center of the amplitude vibrations, so that when the vibrations are stopped, the projected pattern is in focus and thus focusing can be effected easily.

In summary, focusing is attained by vibrating the sensitive surface of the lens mechanism relative to each other and focusing the projected pattern into an image by measuring the reflected light from the sensitive surface (a light of a wavelength outside of the sensitizing range of the dry plate of high resolution and the photoresist). Thus, the foregoing examples should not be construed as limiting this invention specifically thereto.

As is the case with defocusing caused by a zoom lens, the variation in the focal distances due to the difference between the wavelengths of the focusing light and the printing light can be eliminated by previous correction of the position of the focusing pattern or the measuring element. Using dielectric vapor-deposited multi-film construction, the half mirrors herein employed may also be adapted to permit the passage therethrough of substantially the entire printing light but serve as half mirrors for the focusing light. Further, it is needless to say that this device automatically shifts the sensitive surface, the reducing lens and the like based on the measured results from the measuring element, thereby achieving automatic focusing.

A conventional master reticle support device heretofore employed in pattern generator apparatus, automatic drawing instruments or the like, is such that master reticles are manually replaced one by one or patterns prearranged in a checkered form are selectively moved in X–Y direction. Accordingly, the operation is very time-consuming and a very complicated mechanism is required in the case of using complicated patterns. It is very difficult to employ such a conventional support device in the present invention.

Figure 10A:
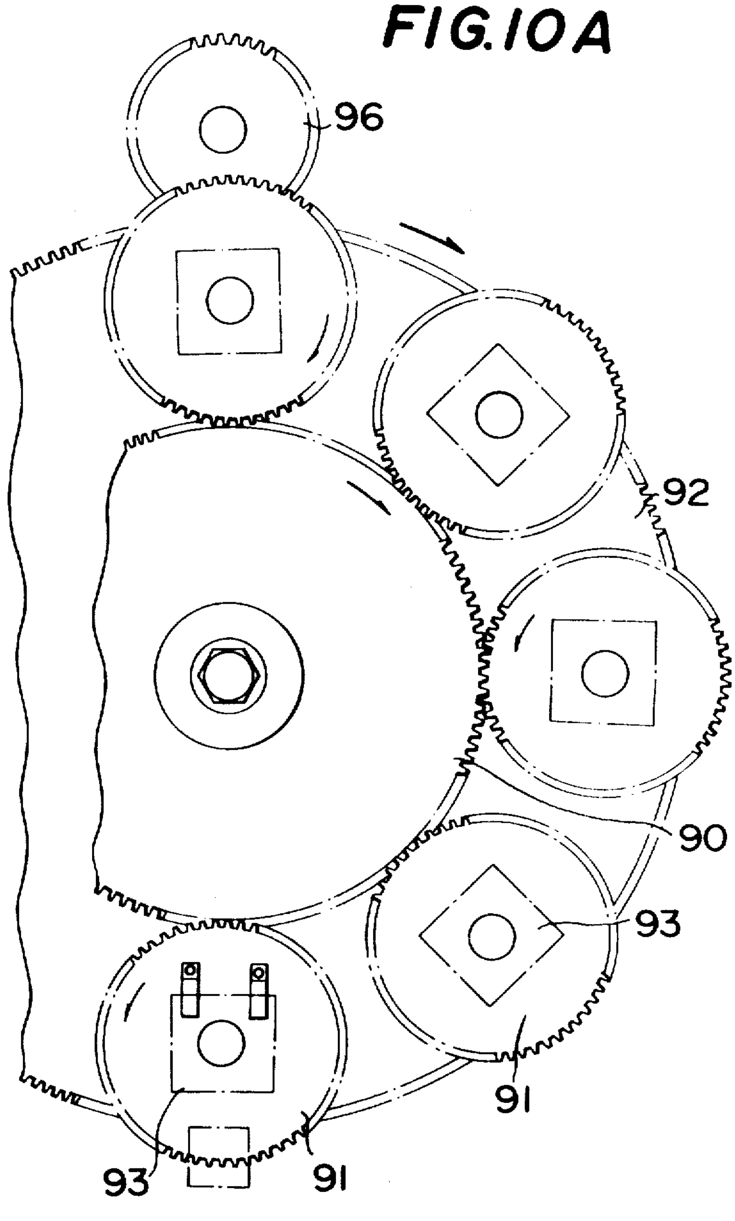
FIGS. 10A and 10B are respectively plane and cross-sectional views of one example of a master reticule support mechanism incorporated in the apparatus of this invention.
Figure 10B:
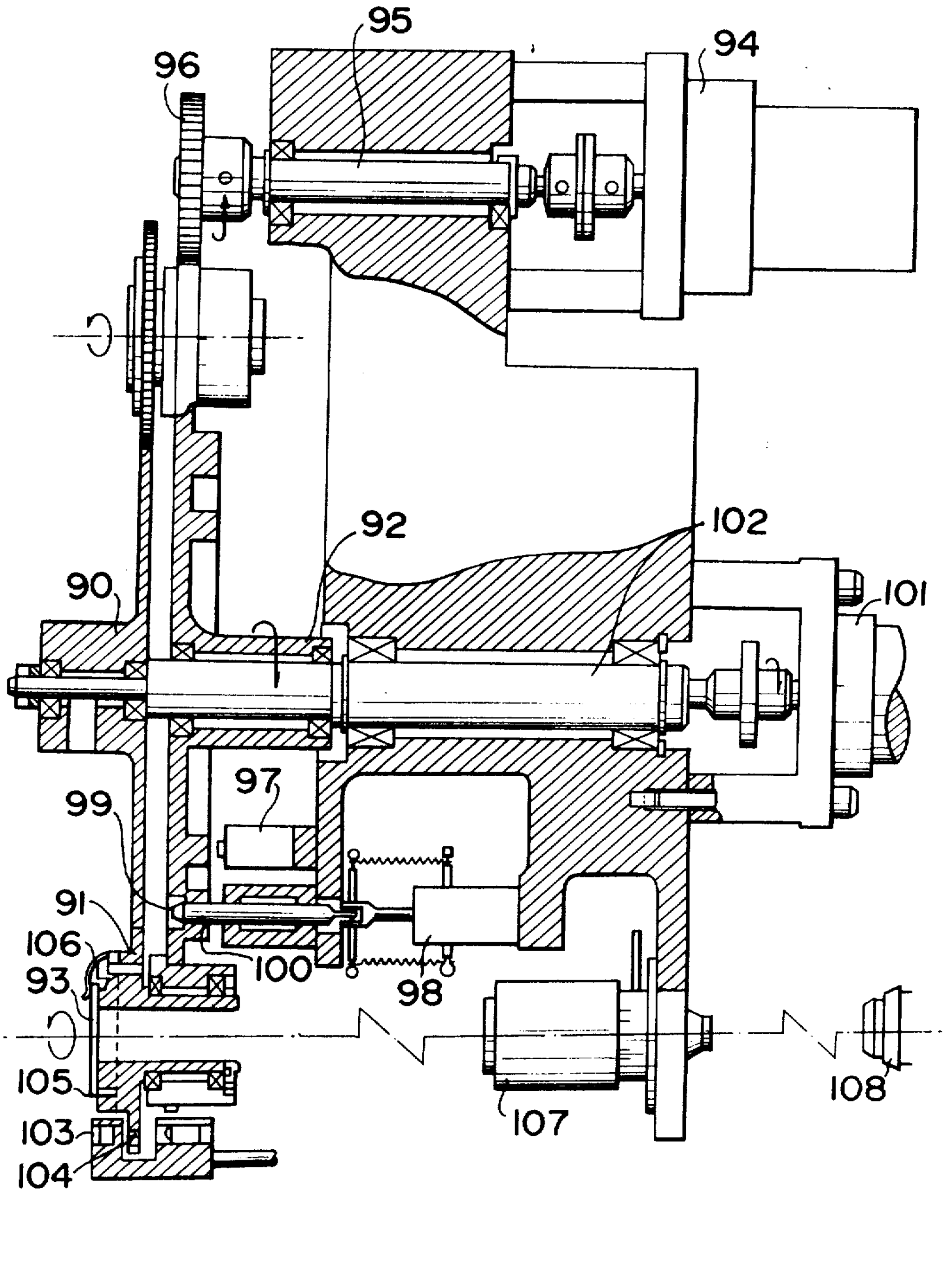

With this invention, it is possible to provide a pattern generator apparatus which is capable of accurate and rapid printing and drafting by the employment of a master reticle support device provided with a rotary mechanism. FIGS. 10A and 10B illustrate one embodiment of this mechanism. The illustrated support mechanism is featured in that it comprises a main table 90, sub-tables 91 and an index table 92 as depicted.

In operation, a master reticle 93 first is set on each of the sub-tables 91. A motor 94 drives a gear 96 through a shaft 95 and the gear 96 rotates the index table 92. When the index table 92 has been rotated through, for example, 45°, the motor 94 is stopped by the operation of a switch 97 and, at the same time, a solenoid 98 is actuated by a signal from the switch to dispose a positioning pin 99 into a positioning hole 100 formed in the index table 92, by which the index table 92 is fixedly indexed at the rotational angular position of 45°.

Figure 11:
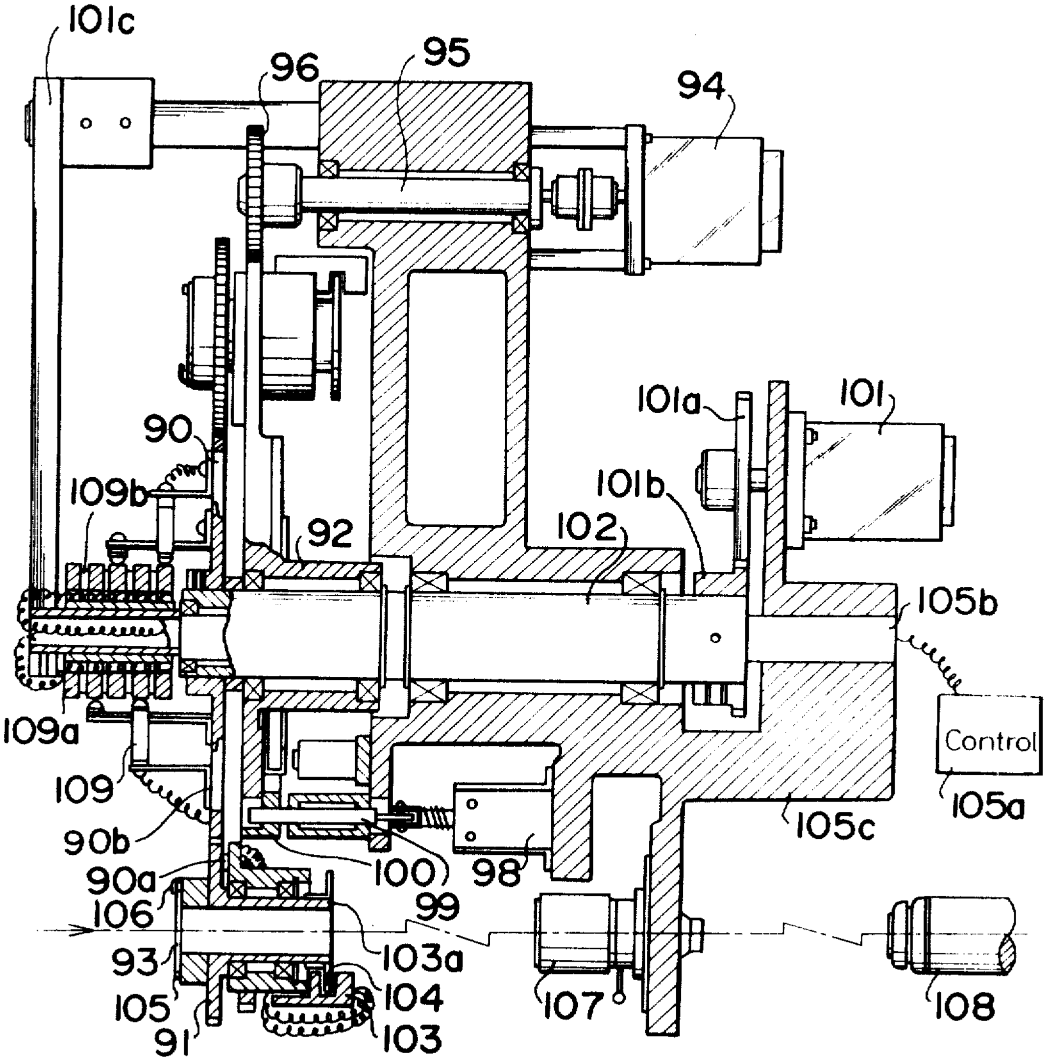
FIG. 11 shows another example of the master reticle support mechanism of this invention.

Then, a motor 101 is actuated to rotate a main shaft 102, thereby rotating the main table 90. The sub-tables 91 are rotated by the main table 90 through teeth formed in the peripheral surfaces thereof. The rotational angle of each master reticle 93 is detected by a switch 103 and each sub-table 91 is stopped at a desired rotational position. If this device is adapted to achieve the rotating operation and the master reticle selecting operation simultaneously, its operating speed can be increased. This may be done, for example, by reconstructing the device of FIGS. 10A and 10B as depicted in FIG. 11. The device of FIG. 11 is identical in the construction of the master reticle selecting and indexing mechanisms with the device of FIG. 10 but is different therefrom in the method of rotating the master reticles. Namely, the master reticles 93 are each rotated and stopped at a desired rotational angular position during the rotation of the index table 92 for selecting one of the master reticles 93. In FIG. 13, parts corresponding to those in FIG. 10B are identified by the same reference numerals. In the present example, upon actuation of the motor 101, a gear 101*a* mounted on its rotary shaft is rotated to drive a gear 101*b* meshing therewith and hence the shaft 102 and the main table 90 coupled thereto. In order to stop the master reticle at a desired angular position, it is sufficient only to control the rotation of the main table 90; the desired angle is detected by a detecting ring 103*a* and the measuring element 103, whose output controls the actuation of the motor 101. The rotation of the main table 90 is accompanied by the rotation of the master reticle 93 set on the sub-table 91. The aforesaid detecting ring 103*a* has formed therein slits 104 at positions corresponding to indexing numbers of the rotational angle of the master reticle. The desired angle can be detected by a suitable measuring element 103 such as a photoelectric tube or the like, in combination with the detecting ring 103*a*.

Electrical connections in this case are as follows. Namely, a cable is interconnected between the measuring element 103 and the main table 90 through a frictional plate 90*a*, and the main table 90 is electrically insulated by an insulating ring 90*b* and connected to a collector ring 109*a* through a brush 109. The collector ring 109*a* is electrically insulated by an insulating ring 109*b*. The other end of the collector ring 109*a* is connected by a cable to a control circuit 105*a* through a hollow cylindrical shaft 105*b*. The hollow cylindrical shaft 105*b* is rotatably mounted by a base 105*c*, the shaft 101*b* secured thereto and an arm 101*c*, as shown in FIG. 11. The above-described operations are achieved while the master reticle is rotated about the optical shaft.

A method of mounting the master reticle 93 on the sub-table 91 in the FIGS. 10 and 11 embodiments is such that the master reticle 93 is urged at one end against the positioning pin 105 and fixed at the other end by a spring biased plate 106. Alternatively, the master reticle 93 may be mounted on the sub-table by other methods, for example, by means of a vacuum chuck, a magneto chuck or the like. Further, it is possible, of course, to increase or decrease the indexing number of the index table at will in accordance with the size of the reticle used. Also, it is contemplated to effect the indexing operation and the master reticle rotating operation simultaneously. In FIGS. 10 and 11, reference numeral 107 indicates a zoom lens and numeral 108 refers to a reducing lens. With such an arrangement as described above, patterns, though complicated, can be readily formed by the combined use of selected ones of the master reticles mounted on the sub-tables.

Figure 12:
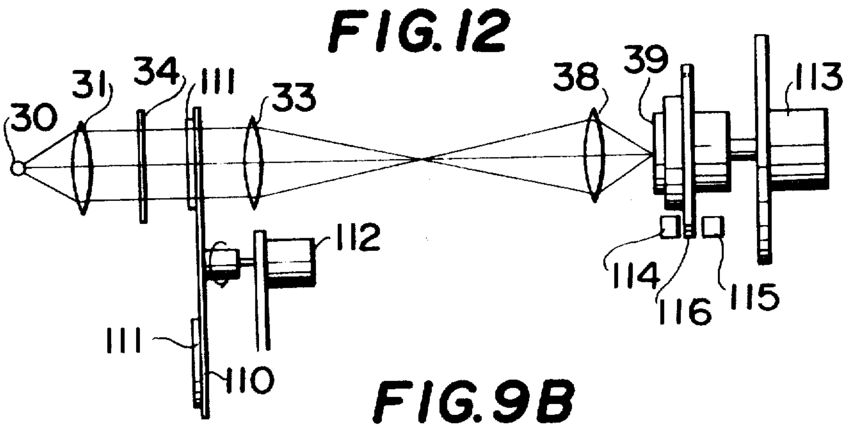
FIG. 12 schematically illustrates another example of this invention, for explaining a mechanism for simultaneously achieving the master reticle selecting operation and the revolving operation of the photosensitive surface.

Further, the operating speed can be increased by a method different from that described above in connection with FIGS. 10 and 11. FIG. 12 schematically illustrates an embodiment of the method and in this figure, parts corresponding to those in FIG. 4 are marked with the same reference numerals. The illustrated example is different from that of FIG. 4 only in that the rotation of an index table 110 for indexing is achieved by a motor 112 for selecting a desired one of master reticles 111 arranged about the index table 110. In the present example, during the operation of selecting the desired master reticle 111, a motor 113 rotates to turn the sensitive surface 39 through a desired angle corresponding to the selected master reticle 111. The rotational angular position at which the sensitive surface 39 is stopped, can be determined by detecting its rotational angle by a position detecting device including a light source 114 disposed to direct a beam of light through apertures or slits 116 placed in a table, onto a suitable light sensitive element such as photodiode 115. With such an arrangement, the operating speed can be increased by simultaneous achievement of the rotating operation and the operation for selecting the master reticle (indicated by 93 in FIGS. 10 and 11, and by 111 in FIG. 12).

The foregoing description has been made in connection with an illustrative master reticle support device accompanied by the rotational movement but, the purposes of this invention can be attained by rotating and stopping the master reticle at a desired rotational angular position and the master reticle support device need not be limited specifically to the foregoing examples.

The rotational angle of the master reticle is detected by reading the angle of the rotational angular position relative to a zero point detecting aperture (indicated by 104 in FIGS. 10 and 11 and by 116 in FIG. 12). For example, it is possible that the angle is read by counting the number of slits cut in the sub-table by a detecting mechanism comprising a luminescent diode and a photodiode.

As described above, the indexing operation and the master reticle selecting operation can be carried out simultaneously. With the use of a zoom lens in the master reticle support device as indicated by 107 in FIGS. 10 and 11, a pattern such, for example, as a circle including a small hole therein can be formed by using a ring-shaped pattern and changing the zoom ratio for each printing. In the case of a pattern such as a square with a projection inclined at angle of 45° thereto, a master reticle having a square pattern and a master reticle having a pattern of a projection inclined at 45° are sequentially arranged on the sub-table overlying the index table for printing.

Figures 13A, 13B:
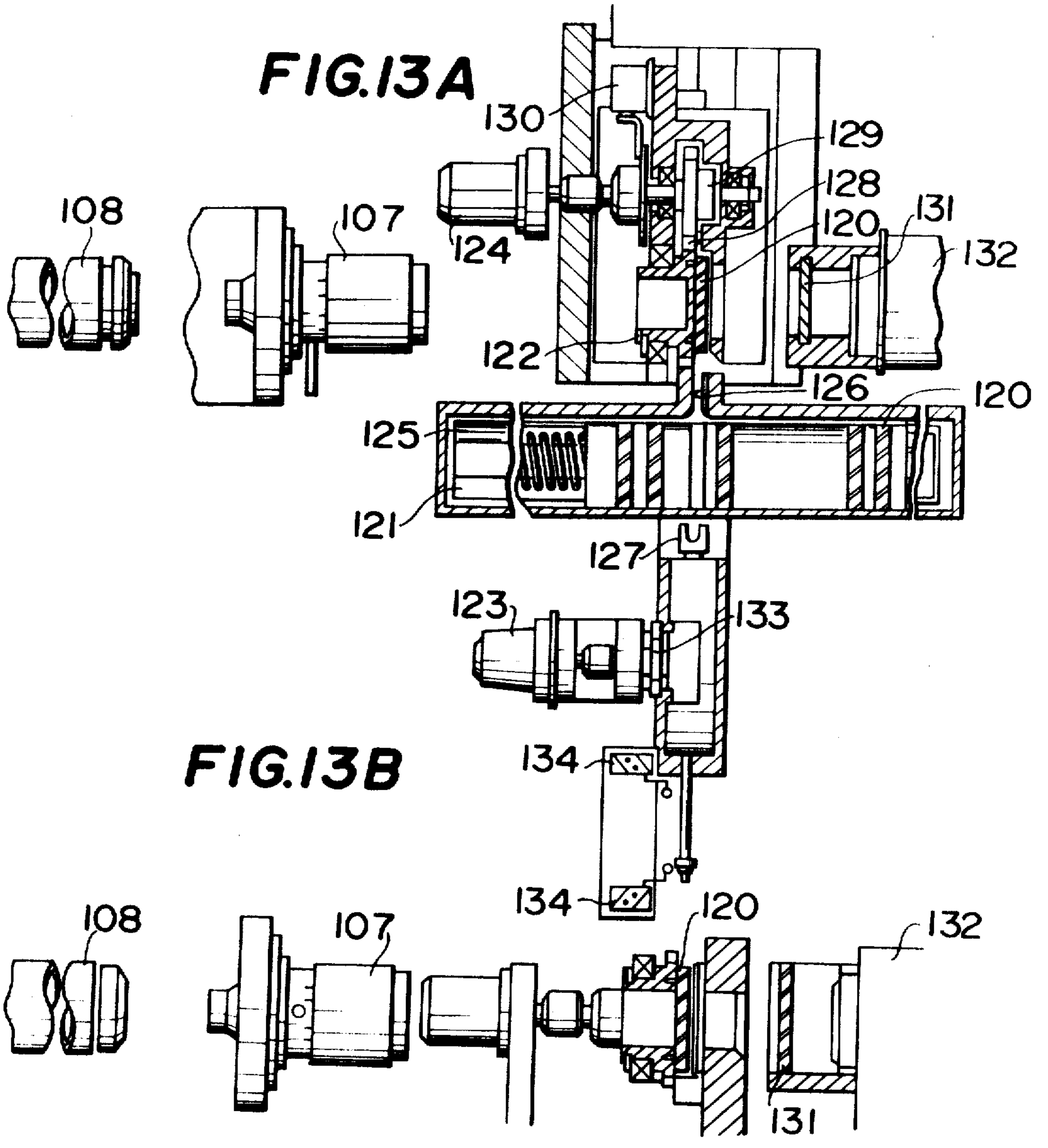
FIGS. 13A and 13B show another example of this invention incorporating a further embodiment of the master reticle support mechanism.

FIGS. 13A and 13B are fragmentary diagrams, similar to FIGS. 10A and 10B, showing another embodiment of the pattern generator apparatus employing the master reticle support device accompanied by the rotational movement. FIG. 13A shows a longitudinal cross-sectional view and FIG. 13B shows a top plan view. The illustrated device has a magazine 121, a sub-table 122 and motors 123 and 124.

In the present example, master reticles 120 are previously housed in the magazine 121 and set on an "X" table 125 which is moved rectilinearly to the right and left by means of an electromagnetic control, a motor or the like.

The "X" table 125 is moved to the right or left to detect the position of a desired one of the master reticles 120 and is stopped at a position where the desired master reticle 120 is aligned with an outlet 126. The motor 123 is started by the detected signal to actuate a rack-and-pinion member 133, which, in turn, actuates a push bar 127 to push the selected master reticle 120 into the sub-table 122. Then, the insertion of the master reticle 120 is detected by a switch 128 and the push bar 127 is pulled back to its initial position in response to the detected signal derived from the switch 128. Further, a vacuum chuck or magneto chuck of the sub-table 122 is actuated by the detected signal and when the master reticle 120 has been set in position, the motor 124 is started to rotate a gear 129 and the sub-table 122 is turned thereby. The master reticle 120 is stopped by a switch 130 at a desired rotational angular position.

This method has an advantage that an appreciable number of master reticles can be used. In FIG. 13A reference numeral 131 designates a filter, numeral 132 refers to a light source and numeral 134 identifies a limit switch.

In summary, the master reticle support device is required only to rotate the master reticle and dispose it at a desired rotational angular position on the optical axis, and this invention is not limited specifically to the above-described illustrative device.

For high-speed operation, a desired one of the master reticles may be selected by flashing a selected one of a plurality of light sources but the rotational movement cannot be omitted, so that only the rotation may be achieved mechanically.

Figure 14:
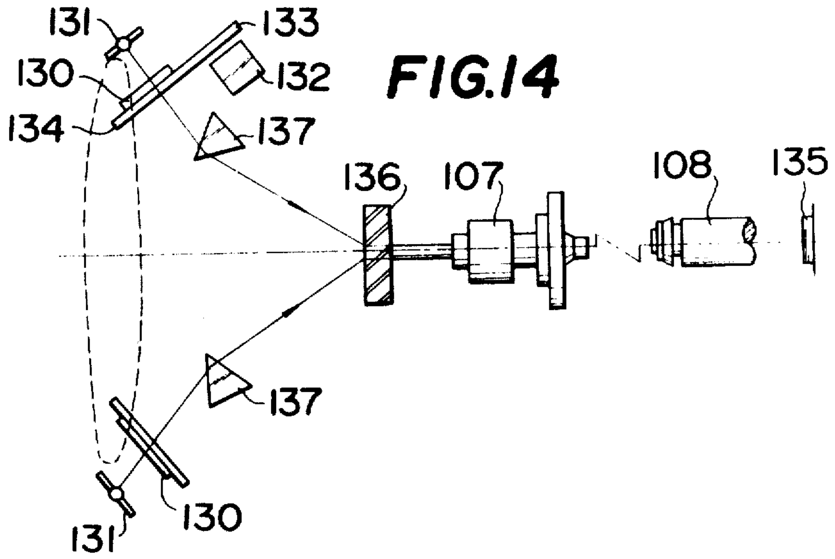
FIG. 14 illustrates another example of this invention which employs a plurality of light sources.

As a further aspect of this invention, the apparatus shown in FIG. 14 is employed for high-speed operation. As illustrated in FIG. 14, a plurality of light sources 131 corresponding to a required number of master reticles 130 are separately arranged at spaced positions and the selected light source of a desired master reticle is energized or flashed. The printing light emanating from the energized light source passes through three lens systems, a prism 137, a zoom lens 107 and a reducing lens 108 to be focused into an image on a sensitive surface 135, thus printing the projected pattern thereto. An index table 134 is mechanically turned by a motor 132 and a gear 133 through a predetermined angle of the selected master reticle 130 and this angle is determined by detecting the number of slits of the index table 134 by the combination of a luminescent diode and a photodiode as described above. This method is advantageous in that the mechanical master reticle selection necessary for printing is unnecessary. In FIG. 14, reference numeral 136 indicates a lens and numeral 137 refers to prisms.

Figure 15:
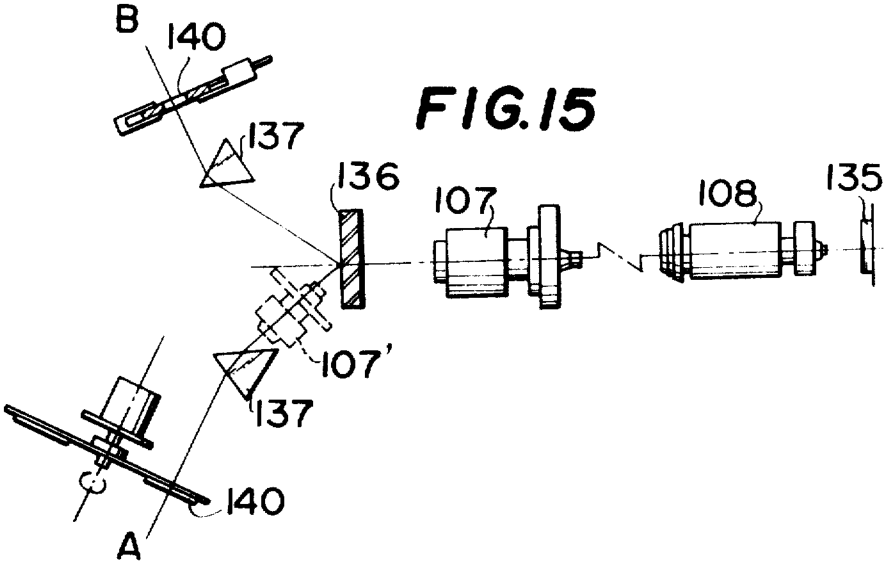
FIG. 15 shows another example of this invention which is provided with the master reticle support mechanism and a variable spot or variable aperture mechanism.

In the case of a method as shown in FIG. 15, the light path of the optical system is the same as that in the FIG. 14, with the addition of two lens arrangements. A master reticle 140 and a variable spot or a variable aperture mechanism (to be described later) are provided on the sides A and B respectively of the optical axis. The master reticle 140 is identical with that depicted in FIGS. 10A and 10B and the pattern is printed on a sensitive surface 135. In FIG. 15, the same result can be obtained, even if the zoom lens 107 is disposed rearwardly of the prism 137 as indicated by dotted lines. On the side B, a variable spot mechanism and an electromagnetically driven variable aperture may be provided and the combined use of these two mechanisms enables rapid and accurate printing and drafting operations of a complicated pattern without the necessity of replacement of master reticles and complicated and expensive equipment.

Figures 16, 17A:
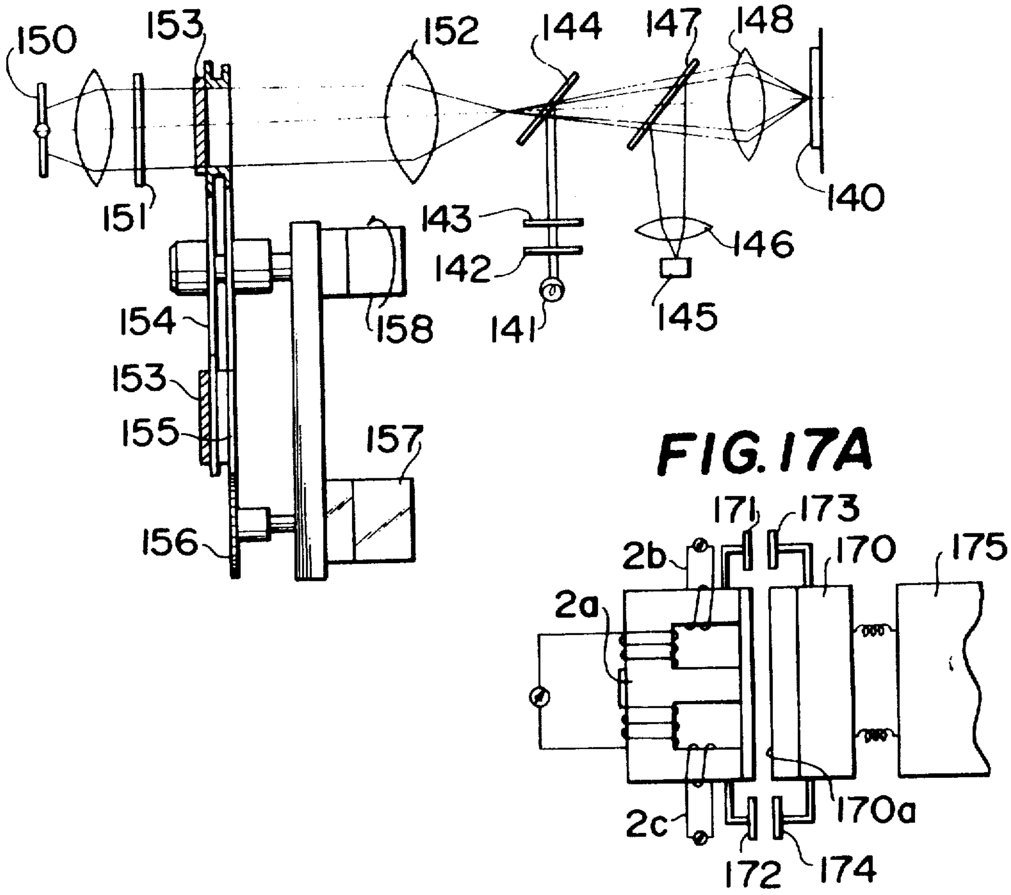
FIG. 16 is a schematic diagram for explaining the principle of another example of this invention.
FIGS. 17A and 17B respectively show one example of a variable aperture mechanism and a detector circuit therefor for use in the apparatus of this invention.

FIG. 16 is a schematic diagram, for explaining the principles of another embodiment of the pattern generator apparatus of this invention, in which the device of FIGS. 10A and 10B is incorporated into the system of FIG. 3. In the present example, a light source 141 for focusing purposes is separately provided and first and second half mirrors 144 and 147 are provided.

The focusing light source 141 is a suitable white lamp, such as a mercury-arc lamp or a luminescent diode. The light emanating from the light source 141 passes through a filter 142 to eliminate thereby that range of wavelengths to which the surface 140 is sensitive. The light having passed through the filter 142 is directed through a focusing pattern 143 and enters the first half mirror 144 to be reflected and refracted through 90°. The reflected image is directed through the second half mirror 147 and a reducing lens 148, to be focused onto an image on the sensitive surface 140. One portion of the light focused onto the sensitive surface 140 is reflected thereby back to pass through the reducing lens 148 again and to be reflected and refracted by the second half mirror 147 through 90° and then condensed by a condensing lens 146. In this case, where the distance between the second half mirror 147 and a measuring element 145 may be large, the condensing lens 146 may be omitted naturally. The condensed projected pattern enters the measuring element 145 and the focus is detected thereby as explained above.

Each of the light source 141, the filter 142 and the pattern 143 can be used to perform the function of the other members, so long as it may well serve their respective purposes. For example, the filter 142 and the focusing pattern 143 become unnecessary under the following conditions where: the luminescent diode is used as the light source 141, the wavelength of the generated light therefrom is not effective to sensitize the photosensitive material used, and a pattern to be ultimately printed is used as the focusing pattern.

Further, for example, by positioning the half mirror at either the center of the light path, outside thereof or at one part of the path to make the printing and focusing lights pass in different paths in the lens system, focusing can be effected with light of the same wavelength as the focusing light without using a filter in the focusing light source and the accuracy of the focusing is maintained. Supplied with a focused signal, a printing light source 150 such as a xenon lamp or the like emits a light, which passes first through one interference filter 151 selected for providing either h-ray (404.7mμ), e-ray (546.1mμ) or g-ray (435.8mμ). Where a zoom lens 152 and a reducing lens 148 are provided with a coating for one of h-ray (404.7mμ), e-ray (546.1mμ) or g-ray (435.8mμ), respectively, a corresponding filter of one of the h-ray, e-ray and g-ray is selectively used as the filter 151, thereby to provide for enhanced resolution.

With the use of the h-ray, a pattern can be printed directly onto a silicon or like wafer coated with photoresist.

When the h-ray filter 151 is used, the light having passed through the filter 151 is made thereby to be of a wavelength of 404.7mμ and passes through a printing pattern, that is, a pattern of a master reticle 153; the image pattern then enters the zoom lens 152 to project the pattern thereon. The projected pattern is reduced by the zoom lens 152 by a selected zoom ratio and is focused; thereafter, the light becomes divergent from the zoom lens 152. One part of the divergent light is directed onto the incident pupil of the reducing lens 148 to focus the reduced projected pattern on a sensitive surface 140, for example, a dry plate of high resolution, a photoresist coated silicon wafer or the like, placed at a second focusing position.

For replacement of the printing pattern with another, a main table 154 is turned to bring a desired master reticle 153 to a predetermined position for printing, as described previously in connection with FIGS. 10A and 10B. In FIG. 16, reference numeral 155 indicates an index table, numeral 156 refers to a gear and numerals 157 and 158 identify motors. The drive mechanism therefor is the same as that shown in FIGS. 10A and 10B. It is noted that the rotational master reticle support device described previously in connection with FIGS. 10A and 10B can be applied to the systems of FIGS. 4 and 5.

A description will be given of an electromagnetically controlled variable aperture mechanism, which is applicable to the pattern generator apparatus for pattern printing.

A conventional variable aperture heretofore employed in pattern printers is mechanically rotated and moved in a straight line by means of a rack-and-pinion, screws and so on. However, the prior variable aperture has a large stroke and is difficult to provide precise figures or patterns, because of the influence of the blacklash of the gears and screws used. Further, it is impossible to control the variable aperture with an accuracy of about 0.1μ.

The pattern generator apparatus of this invention employs an electromagnetically controlled variable aperture for forming precise slits, figures and patterns. The variable aperture may be controlled by magnetic force, magnetostriction or electrostriction.

Figure 17B:
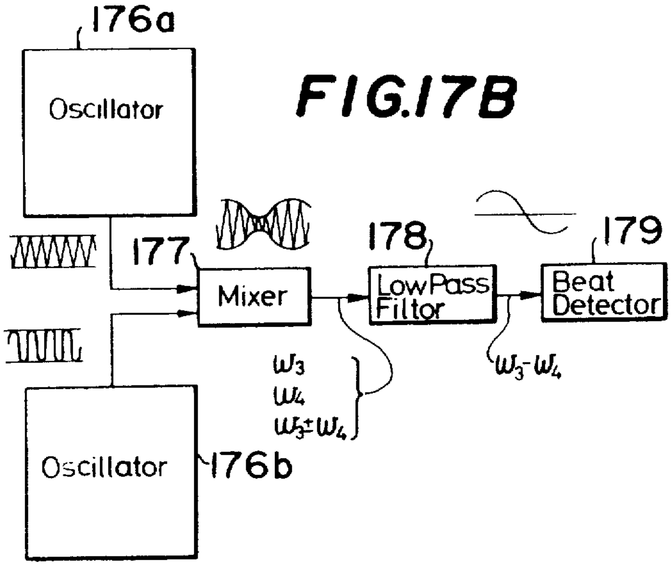

FIG. 17A is a diagram, for explaining the principles of an electromagnetically driven variable aperture. FIG. 17B is a block diagram of a detector circuit therefor. In FIG. 17A, a fixed electromagnet *2a* is supplied with a current to move a movable part 170 to provide a predetermined slit gap d. If, now, a current is applied to the electromagnet *2a* to establish a slit of the predetermined gap d, the part 170 does not move uniformly and its surface *170a* becomes inclined to such an extent as equal to a difference in wavelength. The gap and the inclination of the surface *170a* may be detected by a light interference method or in the form of capacitance changes of capacitors between electrodes 171 and 173, and 172 and 174 disposed at both ends of the slit. The electrodes 171 and 172 are mounted on the fixed electromagnet *2a*, while the other electrodes 173 and 174 are mounted on the movable part 170. Further, springs 175 are attached at one end to the movable part 170.

A method of detecting the slit gap as a function of the capacitance variations of capacitors will now be described. Where disc electrodes 171 to 174 have a confronting surface 2cm in diameter and are disposed a distance of 100μ apart, the capacitance therebetween is 2.78pF; a change of 1μ in the gap provides a corresponding change of about 0.029pF in the capacitance, and a change of 0.1μ in the gap provides a change of 0.0029pF in the capacitance. Accordingly, the gap can be detected by the detection of the capacitance change occurring between the electrodes 171 and 174. A description will be given now of the method of detecting the slit gap when the slit is inclined. As shown in FIG. 17B, a first oscillator circuit *176a* is provided whose output frequency is dependent upon a tank circuit thereof comprising a capacitor formed by the electrodes 171 and 173. A second oscillator circuit *176b* provides an output whose frequency depends upon a capacitor formed by the electrodes 172 and 174. The frequencies of the outputs of the oscillator circuits *176a* and *176b* are taken as $W_3$ and $W_4$, respectively. The oscillator outputs are divided by a mizer 177 into three frequencies $W_3$, $W_4$ and $W_3 \pm W_4$. The output of the mixer 177 is applied through a low-pass filter 178 to a beat detector 179 which provides an indication of a beat of only the lower frequency $W_3 - W_4$. Then, the slit can be moved in parallel by controlling the amplitudes of current *2b* or *2c* of the electromagnet *2a* in such a manner as to provide a beat frequency at which the parallelism of the slit can be neglected. Further, it is also possible to set the slit at a predetermined angle by previously measuring the beat frequency and therefore, the inclination angle of the slit. Namely, the oscillation frequency of a tank circuit incorporated into oscillator circuits *176a* and *176b* is given by $f=1/2\pi\sqrt{LC}$. Consequently, where a change of 1μ in the slit gap causes a change of about 0.029pF in the capacitance of the tank capacitor, that is, about 1/100 of the initial value if the fundamental frequency is assumed to be 1MHz, the beat frequency is about 5KHz. In the case of a change of 0.1μ in the slit gap, the resulting beat frequency is 500Hz. Accordingly, an accuracy of 0.1μ can be obtained by controlling the current *2b* or *2c* of the electromagnet *2a* in such a manner that the beat frequency may be lower than 500Hz.

It is also advisable to incorporate the abovementioned capacitors formed by contacts 171 to 174 into a bridge circuit. In this case, it is possible to detect the slit gap by measuring the output of the bridge circuit depending upon whether or not the values of these capacitors are approximately equal to each other. The circuits, per se, shown in FIG. 17B are well-known in the art and further description thereof is not needed.

The detector circuit 179 for use in this invention is not limited specifically to the above-described one and any circuit construction may be employed so long as it enables measurements of the distance of the movement of the slit and its inclination based on the values of at least the two above-mentioned capacitors. It is preferred to adapt the electromagnet shown in FIG. 17A to cause magnetic flux saturation in its magnetic circuit so that even when the movable part 170 approaches the electromagnet 2*a*, its magnetic force does not increase greatly, to ensure avoidance of their collision. Alternatively, a driving method utilizing a magnetostrictive element or an electrostrictive element other than the electromagnetic driving method described above may be employed, but it is needless to say that the movement and inclination of the slit can be detected by the same detector circuit as that described above.

In the optical system of the present invention, it is necessary that the shape and size of the spot be automatically adjusted as required. This invention employs an electromagnetic drive method for adjusting the diaphragm of the optical instruments and the shape of the spot, by which the shape of the spot can be adjusted, as required, continuously, rapidly and accurately.

Figure 18B:
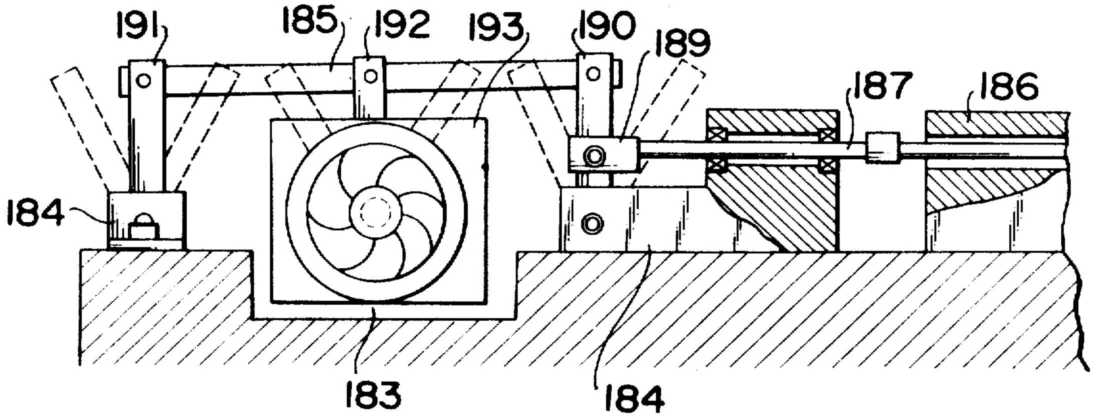
FIGS. 18A and 18B are respectively perspective and cross-sectional views of a variable spot mechanism for use in the apparatus of this invention.
Figure 18A:
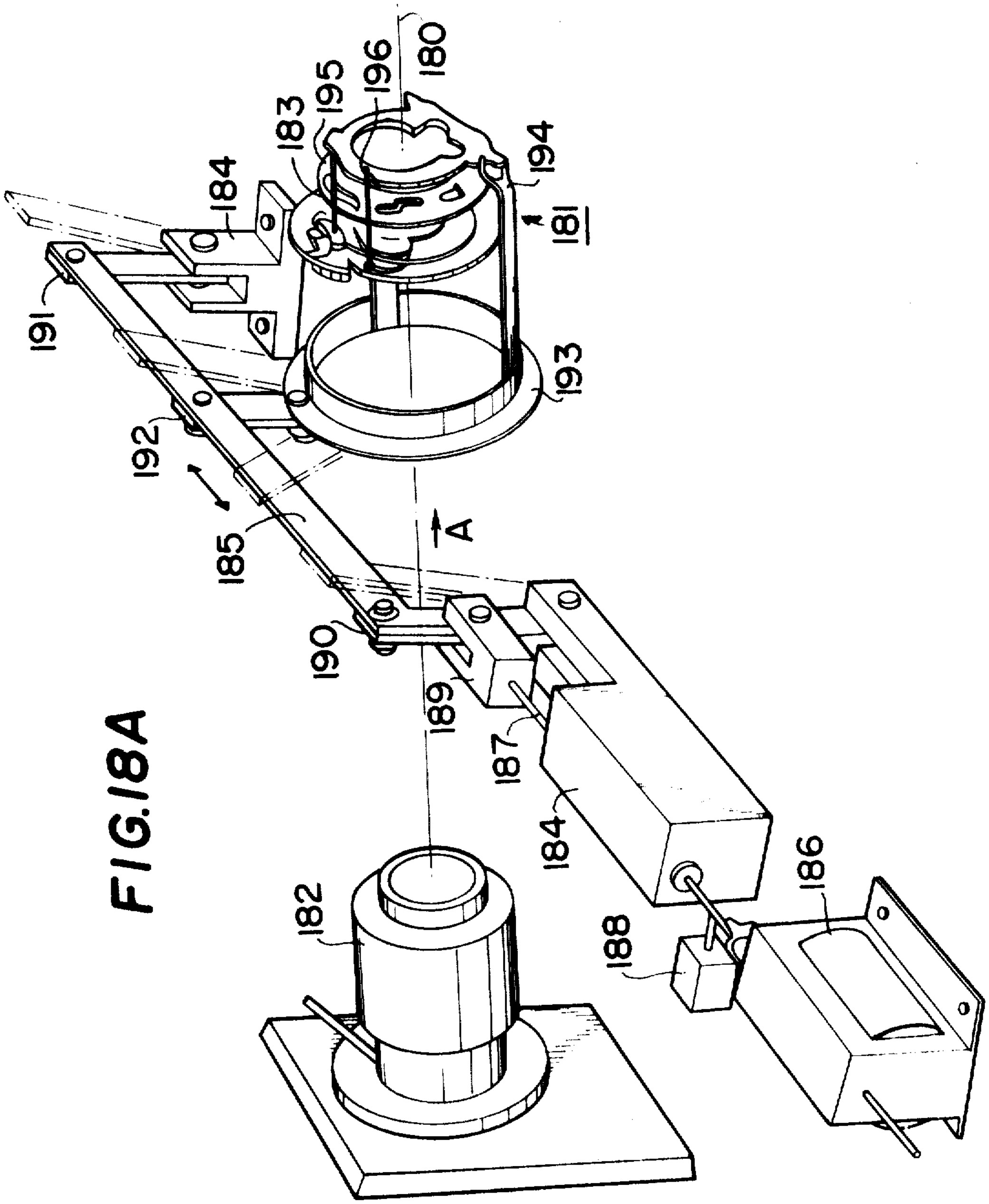

FIGS. 18A and 18B illustrate one example of an electromagnetically driven variable spot mechanism, FIG. 18A being a perspective view of the mechanism and FIG. 18B being a front view of one part thereof. In FIGS. 18A and 18B, reference numeral 180 indicates an optical axis of a printing light source, numeral 181 refers to a spot adjusting device and numeral 182 identifies a zoom lens. The spot adjusting device 181 includes a diaphragm portion 183, a bearing block 184, a fixing block 184', a parallel link 185 and an electromagnet 186. When a desired spot is to be formed, the electromagnet 186 operates to drive a push bar 187. The distance of the movement of the push bar 187 is detected by a distance detector 188 and the electromagnet 186 is deactuated at a predetermined position. Since the shape of the spot formed by the diaphragm 183 is determined by its degree of rotation, the straight-line distance and the rotational angle $\theta$ of the electromagnet 186 are previously corrected. The push head 189 driven by the electromagnet 186 is coupled to an arm 190 so that when the arm 190 is pushed down by the push head 189, the parallel link 185 supported at both ends by two arms 190 and 191, moves laterally. Since the parallel link 185 has coupled centrally thereto a support arm 192, the arms 190 and 191 and the support arm 192 are directed to the positions indicated by broken lines when the electromagnet 186 is actuated. Consequently, a rotary ring 193 is rotated through an angle corresponding to that through which the arms 190 and 191 are turned, and a diaphragm ring 195 is rotated through a coupling arm 194 so that a shaft 196 fixed to the diaphragm ring 195 is also turned. As a result of this, the diaphragm 183 is opened or closed as indicated by broken lines in FIG. 18A, thereby forming a desired spot.

Since the diaphragm 183 is of mechanical construction, it cannot be a perfectly smooth circle; but, it can be made smoothly circular to a greater extent by increasing the number of its blades. However, it is more effective to form a smooth circle by using a zoom lens 182 as shown in FIG. 18A and by changing its zoom ratio.

Figure 19A:
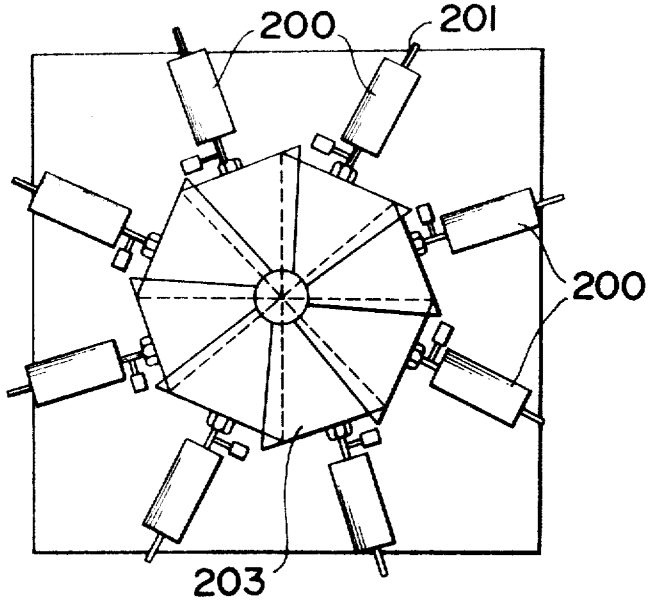
FIGS. 19A and 19B are plan and cross-sectional views of another variable spot mechanism, respectively.
Figure 19B:
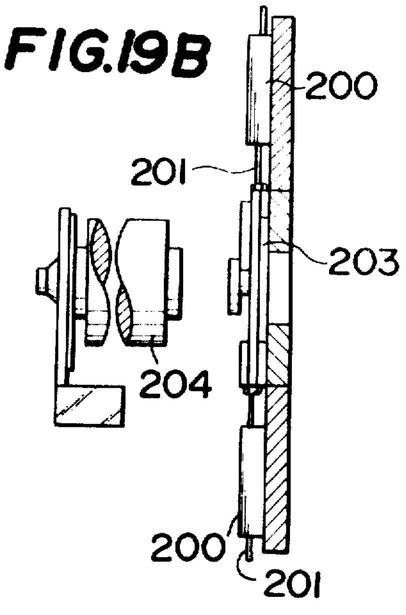

FIGS. 19A and 19B show a modified form of the variable spot mechanism which employs a plurality of electromagnets 200 and a plurality of slide blades 203. The slide blades 203 are adapted to overlap so as not to collide with one another when they are pushed or pulled back. When a desired shape of the spot is required, the electromagnets 200 operate to push out the push bars 201 by their magnetic force. The distance required for the push bars 201 to be pushed out to obtain a desired shape of the spot is predetermined. The distance that the push bars 201 are moved is detected by a distance detector and the operation of the electromagnets is stopped at a desired position. Thus, the desired shape of the spot is defined by the respective slide blades 203. An increase in the number of the slide blades 203 makes the shape of the spot smoother. A spot of accurate size can be obtained by providing an electromagnetically driving magnet for each slide blade 203 and by using the slide blade assembly in combination with a zoom lens 204 as shown in FIG. 19B.

The foregoing has described in detail examples of the respective parts of the apparatus of this invention. The pattern generator apparatus of this invention can be assembled by combining the respective mechanisms.

Figure 20:
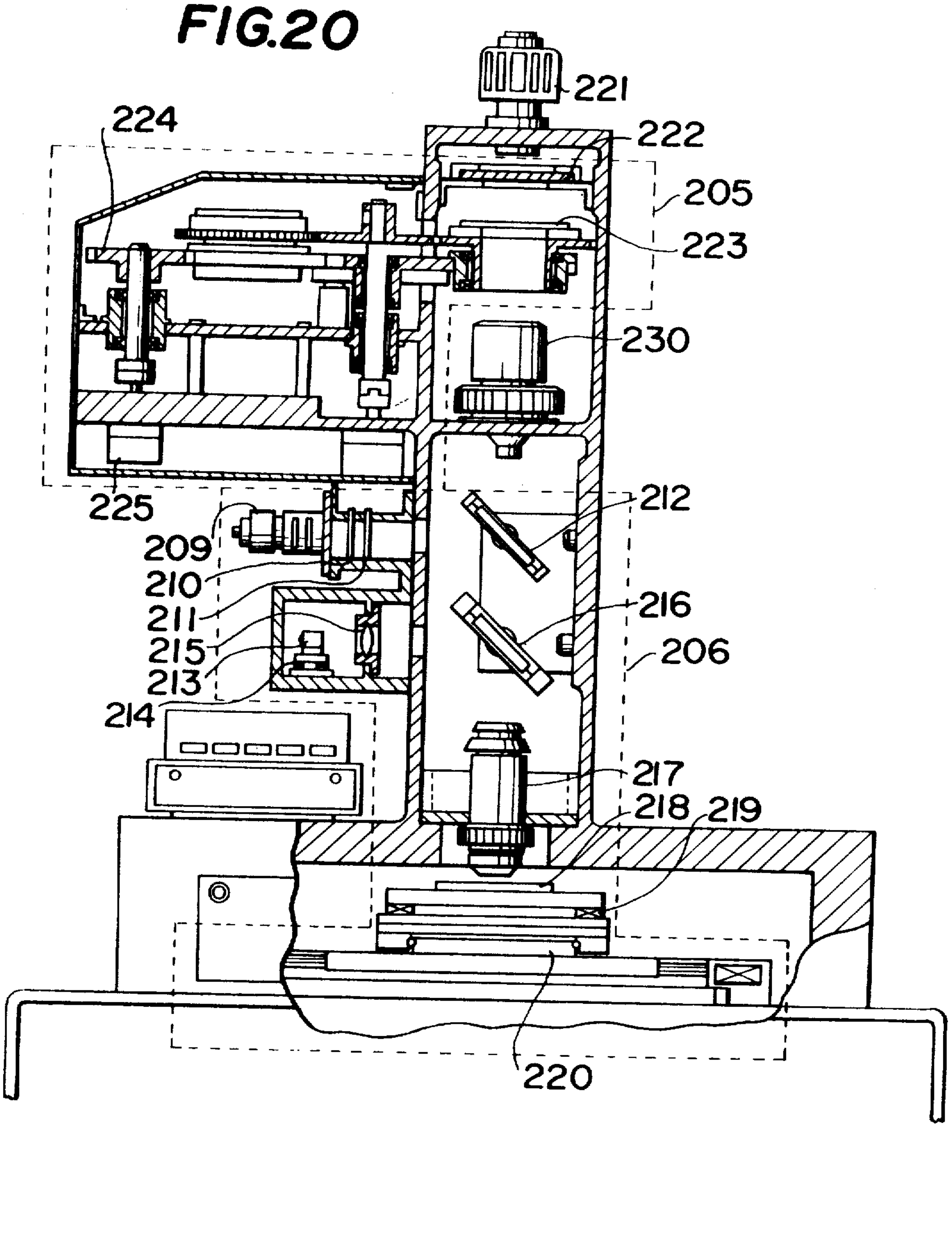
FIG. 20 illustrates an illustrative embodiment of this invention employing the mechanism depicted in FIG. 16.

FIG. 20 illustrates one embodiment of the apparatus of this invention, which employs the focusing and position detecting mechanism 206 (indicated by broken line) and the master reticle support mechanism 205 (indicated by broken line) described above. In FIG. 20, reference numeral 209 indicates a focusing light source, numeral 210 refers to a filter, numeral 211 identifies a focusing pattern, numeral 212 refers to a first half mirror, numeral 213 identifies a measuring element, numeral 214 refers to a vibrator, numeral 215 indicates a lens, numeral 216 refers to a second half mirror, numeral 217 refers to a reducing lens, numeral 218 indicates a sensitive surface, numeral 219 refers to a vibrator and numeral 220 identifies an X–Y table. The actuating mechanism therefor and the focusing and focal position detecting mechanism are as described previously in assembly 206. In FIG. 20, reference numeral 221 identifies a printing light source, numeral 230 refers to a zoom lens, numeral 222 indicates an h-ray filter, numeral 223 identifies a master reticle, numeral 224 refers to a table driving gear and numeral 225 indicates a table driving motor. The operative condition of the master reticle support mechanism shown in FIG. 20 is as shown in detail in assembly 205.

The light emanating from the printing light source 221 passes first through the filter 222 which may be one of the following: h-ray (404.7m$\mu$), e-ray (546.1m$\mu$) or g-ray (435.8m$\mu$). Where the zoom lens 230 and the reducing lens 217 are given a coating for one of the h-ray (404.7m$\mu$), e-ray (546.1m$\mu$) or g-ray (435.8m$\mu$), a filter of the corresponding h-ray, e-ray and g-ray type is selectively used as the filter 151, thereby to provide for increased resolution. With the use of the h-ray filter, printing can be effected directly on a silicon wafer or the like coated with photoresist. The light having passed through the filter 222 is rendered into a light of a wavelength of 404.7m$\mu$ and falls upon the zoom lens 230 to be projected as a slit spot as formed by the master reticle 223 or a variable aperture (not shown). The pattern projected on the zoom lens 230 is reduced to about 1/10 to 1/80 by selecting the zoom ratio and it becomes divergent as it leaves the zoom lens 230. One part of the divergent light is directed onto the incident iris of the reducing lens 217 to reduce the projected pattern down by a further factor of 1/25 and the reduced pattern is focused onto the sensitive surface 218 placed at a second focusing position. The sensitive surface is, for example, a high resolution dry plate, a photoresist coated silicon wafer or the like, on which the projected pattern is printed after being reduced as described above. The projected pattern can be reduced down to about 1/250 to 1/2000 of the original pattern. The focusing operation is achieved in the manner described previously in connection with FIG. 3. Namely, the focusing light source 209 is separately provided and the light emanating therefrom passes through the focusing pattern 211, the filter 210 and the first and second half mirrors 212 and 216 and enters the reducing lens 217, through which the projected pattern is directed onto the sensitive surface 218. The light incident on the sensitive surface 218 is reflected thereby back to pass through the reducing lens 217 and is reflected and refracted by the second half mirror 216 to be condensed by the condensing lens 215, by which the image of the focusing pattern 211 is formed on the measuring element 213 so that the degree of focus of the projected pattern is detected.

The focus may be detected by the following methods. Namely, the projected pattern and the pattern of the masuring element are previously positioned relative to each other and then the degree of focusing is detected based on the light output of the measuring element, or alternatively, the border of light and darkness of the projected pattern is caused to cross the measuring element relative to each other and a differential value of the output of the measuring element is read. The methods have been described in detail previously in connection with FIGS. 3 to 9A and 9B.

The printing may be effected in the following manner. For example, the sensitive surface 218 is previously vibrated and when the projected pattern is in focus, the sensitive surface 218 is vibrated in synchronism with the light source. When the vibration has attenuated to such an extent that no problem occurs, the light source is flashed, by which it is possible to effect focusing and printing in a short time. With the present invention, the focusing and printing operation on a dry plate with unevenness of 12$\mu$ can be repeated at a speed of more than 50 times per second with the focus being held within 0.05$\mu$ by using a xenon lamp having a flash time of 10$\mu$ sec.

Using the light reflected by the sensitive surface 218, it is possible to detect the conditions of the sensitive surface 218. For example, the position of the sensitive surface with respect to existing patterns such as an oxide film pattern and the pattern of a photosensitive material may be detected. Namely, since the spectrum of light reflected from the oxide film or its intensity for a single wavelength are different from those of light reflected from silicon, the border between the oxide film and silicon and the condition on the surface of silicon can be detected by measuring the spectrum and intensity of the reflected light. Accordingly, the relative positioning of the existing pattern and the next printing master reticle can be effected simultaneously with focusing.

Figure 21:
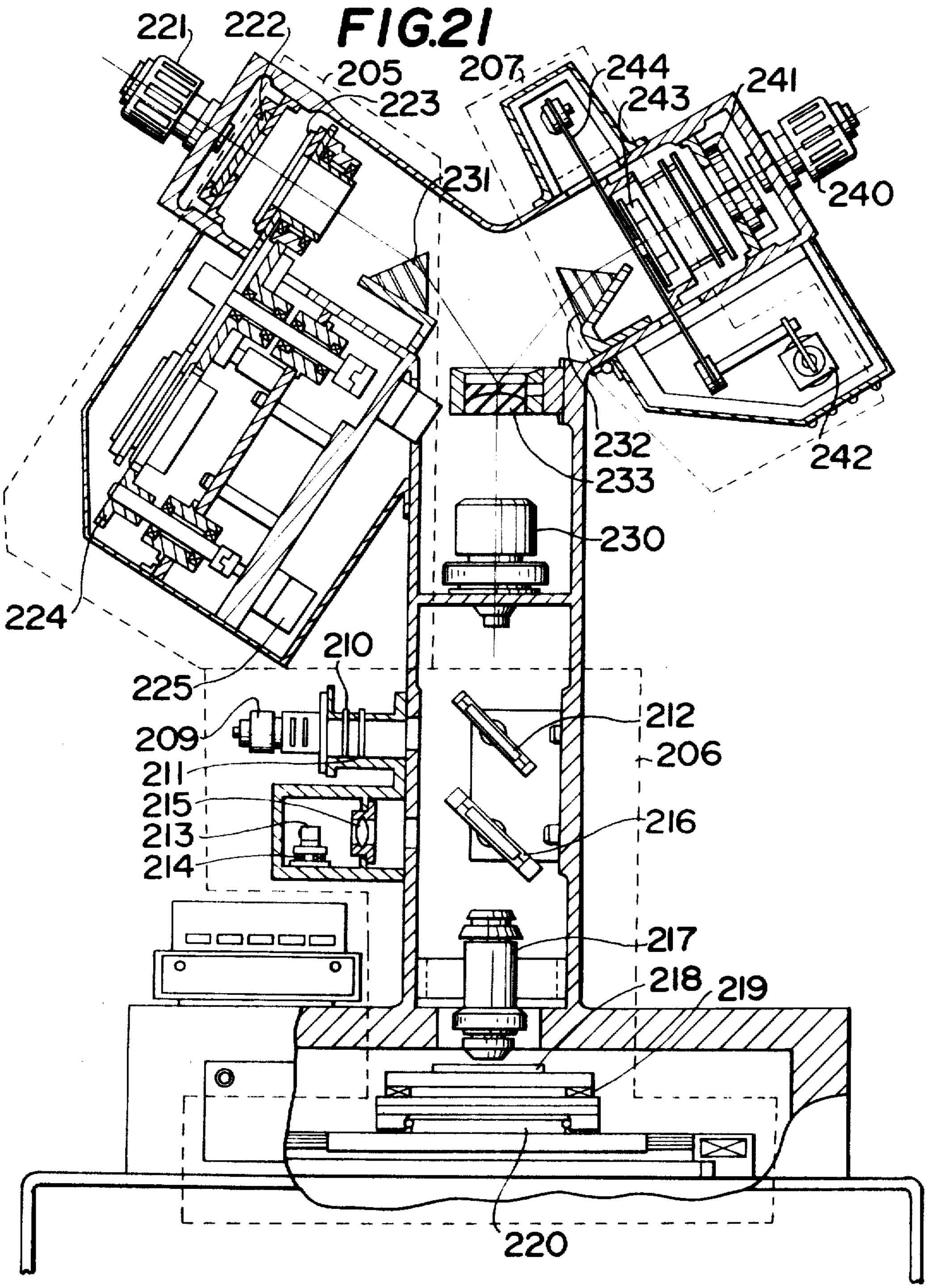
FIG. 21 shows another practical embodiment of this invention employing the master reticle selecting mechanism and the variable spot mechanism.

FIG. 21 illustrates another embodiment of the apparatus of this invention. The principles of the apparatus are as described in connection with FIGS. 14 an 15. In the illustrated example, the mechanisms 206 and 205 indicated by broken lines are the same as those shown in FIG. 20 and the parts corresponding to those in FIG. 20 are identified by the same reference numerals. In this case, however, the light emanating from the printing light source 221 passes through a prism 231 and a lens 233 to be directed onto the zoom lens 230. In FIG. 21, the assembly 207 indicated by a broken line is an electromagnetically driven variable spot mechanism, which is similar to that shown in FIGS. 18A and 18B. Reference numeral 240 indicates a printing light source, numeral 241 refers to a filter, numeral 242 identifies an electromagnet, numeral 243 indicates a diaphragm, numeral 244 refers to a parallel link, numerals 231 and 232 indicate prisms and numeral 233 identifies a lens.

The operation of the present example of the assembly 207 will be described briefly. the light emitted from the printing light source 240 passes first through a filter 241 selected as one of those for h-ray (404.7m$\mu$), e-ray (546.1m$\mu$) or g-ray (435.8m$\mu$). Where the zoom lens 230 and the reducing lens 217 are provided with a coating for the h-ray (404.7m$\mu$), e-ray (546.1m$\mu$) or g-ray (435.8m$\mu$), the filter 241 is selected as a corresponding type, i.e. either for an h-ray, e-ray or g-ray filter, thereby to provide for enhanced resolution.

The light having passed through the filter 241 has a wavelength of 404.7m$\mu$, and is directed through the diaphragm 243, the prism 232 and the lens 233 onto the zoom lens 230. A variable spot pattern formed by the diaphragm 243 is projected onto the zoom lens 230. The spot light incident on the zoom lens 230 is reduced by a selected zoom ratio and is focused onto the zoom lens 230; thereafter, the spot light becomes divergent as it is projected from the zoom lens 230. One part of the divergent light enters the incident iris of the reducing lens 217, by which the projected spot pattern can be printed onto the sensitive surface 218 located at the second focusing position.

Accordingly, in the present example, the pattern of a desired master reticle is selected on the side of the assembly 205 indicated by the broken line and a desired variable spot is determined on the side of the assembly 205 indicated by the broken line. When the projected pattern is brought into focus on the sensitive surface 218 by the focusing mechanism the printing light sources 221 and 240 are flashed as previously described. Since these light sources are simultaneously lighted, the printing light passes through two lens systems, that is, the prisms 231 and 232, the lens 233, the zoom lens 230 and the reducing lens 217 to be focused into an image on the sensitive surface 218, thereby printing the projected pattern thereon. In this case, the index table is mechanically turned by a motor 225 and a gear 224 through a desired angle to select the master reticle 223 of desired pattern, as described previously in connection with FIGS. 10A and 10B. The selected pattern can be repeatedly printed.

In the present embodiment, the assembly 207 has been described to include the variable spot mechanism. However, it will readily be understood from the foregoing description that the variable spot mechanism may be replaced or used with the aforementioned variable aperture assembly.

With the pattern generator apparatus described in the foregoing, complicated patterns can be printed rapidly and accurately without replacement of master reticles and the use of complicated and expensive equipment.

Figure 22:
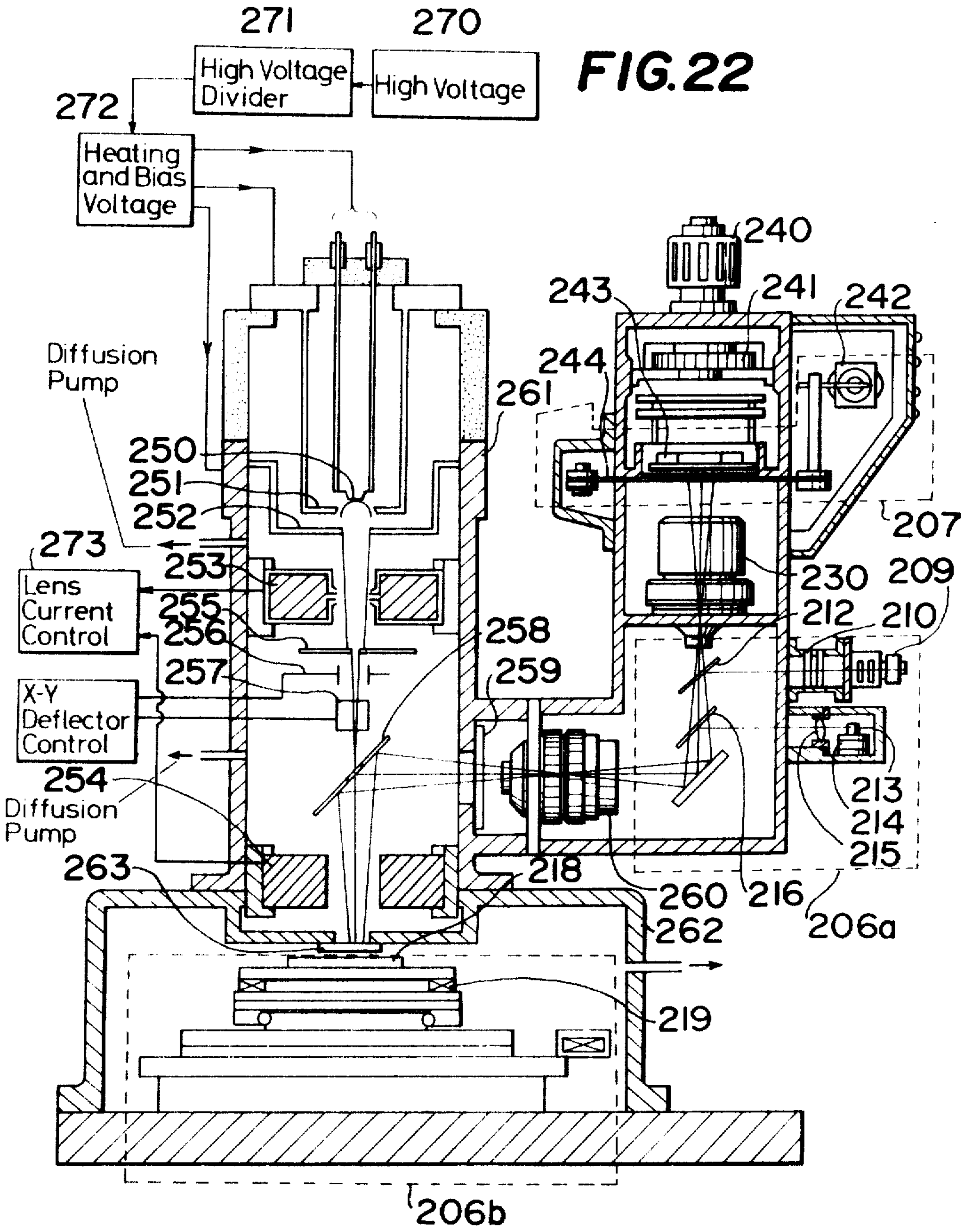
FIG. 22 shows another example of this invention which employs an electron beam exposure system and a reducing lens exposure system.

FIG. 22 illustrates another excample of this invention which employs an electron beam exposure system and a reducing lens exposure system in combination.

A description will be given first of the electron beam exposure system. In a vacuum chamber 261 there are disposed a cathode 250, a Wehnelt electrode 251, an anode 252, a condenser lens 253, an objective lens 254, an aperture 255, an X-deflector 256, a Y-deflector 257, a reflecting mirror 258, and a transparent glass 259 with a packing. The cathode 250, the Wehnelt electrode 251 and the anode 252 are placed at selected voltages by power source units 271, 272 and 273. Reference numeral 273 designates a controller for controlling currents fed into the condenser lens 253 and the objective lens 254. Reference numeral 274 indicates an X–Y deflector controller for supplying a suitable voltage to the X and Y- deflectors 256 and 257 to deflect an electron beam. The aperture plate 255 is provided for suitably limiting the diameter of the electron beam. The vacuum chamber 261 is connected to a diffusion pump, which establishes high vacuum of about $10^{-6}$-Torr within the chamber 261. The cathode 250 is heated with a relatively low voltage signal (capacity of about 3A at 100V) to emit the thermoelectrons to be accelerated by the anode 252. The Wehnelt electrode 251 is an electrode for controlling the thermoelectron current. In an ion gun used for the purpose of this invention, the cathode 250, the Wehnelt electrode 251 and the anode 252 typically are held at about -20 to -100 KV, about -10 KV and zero volts, respectively. The electrons accelerated by the anode 252 are focused by the condenser lens 253 to pass through the aperture plate 255, are suitably deflected by the X- and Y-deflectors 256 and 257 to pass through a centrally disposed aperture of the reflecting mirror 258, and then further are focused by the objective lens 254 to have a predetermined beam spot and intensity onto the sensitive surface 218 (a photosensitive plate in this case), exposing a photosensitive agent coated thereon.

The predetermined beam spot can be obtained by controlling exciting currents fed to the condenser lens 253 and objective lens 254. The predetermined intensity can be obtained by controlling the voltage fed to the Wehnelt electrode 251. Further, the exposure position can be controlled by controlling a voltage applied to the X–Y deflector 274. The range of deflection of the deflector 274 is limited, so that it is advisable for wide-range exposure to use an X–Y table 219 holding the photosensitive plate. Thus, electron beam exposure can be achieved by controlling the electron beam spot, the beam intensity and the position of the photosensitive plate within their adjustable ranges, respectively.

Next, the reducing lens optical system will be described. In FIG. 22, an assembly 207 surrounded by a broken line is substantially the same as that shown in FIG. 21 and the elements therein are identified by the same reference numerals. The assembly 207 is a variable spot mechanism and its construction is similar to that described previously in connection with FIGS. 18A and 18B. Further, assemblies 206*a* and 206*b*, surrounded by broken lines, are substantially the same as the assembly 200 shown in FIG. 21. Reference numeral 260 indicates a lens having a long focal distance and high resolution. A real image formed by lens 260 is projected onto the photosensitive plate by the reflecting mirror 258 which is disposed in the vacuum chamber 261 and has a centrally disposed aperture. Reference numeral 262 identifies a vacuum chamber, which incorporates therein the assembly 206*b* and is constructed so that the photosensitive plate 218 may be disposed in and out thereof. Further, the vacuum chamber 262 is adapted to be held at a vacuum of about $10^{-6}$Torr. by means of a diffusion pump during exposure. Reference numeral 263 indicates a cover for holding the vacuum chambers 261 and 262 airtight. When the photosensitive plate 218 is loaded, the cover 263 is closed and when the degree of vacuum of the vacuum chamber 262 has been raised the cover is opened to permit the passage of the electron beam or light.

Usually, electron beam exposure is capable of achieving resolution far greater than that achieved with optical exposure. Namely, it is extremely easy to resolve a line having a width in the order of 500 to 5000A. On the other hand, however, exposure of a thick line by enlarging the electron beam spot causes an increase in the emission current with an increase in the beam spot, so that an ion gun of large capacity is necessary. Further, the condenser lens, the objective lens, etc. therefor are on a large scale, and accordingly, the electron beam exposure is not profitable in the case of thick lines and the like. Therefore, it is preferable to employ such a method whrein scanning with a small beam spot is effected over a wide area. Thus, the electron beam exposure is high in resolution but is undesirable in that the time for exposure over a wide area is appreciably long.

While, in the case of the optical exposure, the aerial resolving power of a high resolution lens available at present has a theoretical critical value of about 1500 line/mm, the resolution for practical printing is 1000 lines/mm at the maximum. Expressed in units of A, line resolution is approximately 5000A. Namely, electron beam exposure is capable of achieving much greater resolution as compared with optical exposure. Further, optical exposure has an undesirable side effect that the tip of an acute-angled part is rounded due to the property of the lens used therein. This effect is negligible in the practical use of the electron beam exposure, because the projected beam spot is small.

In the present invention, the electron beam exposure and the reducing lens exposure are used in combination, providing for enhanced resolution and shortened time of exposure.

Figure 23A:
FIGS. 23A, 23B and 23C are diagrams for explaining an exposure process for forming a predetermined pattern by using reducing lens exposure, electron beam exposure and both of them in combination, respectively.
Figure 23B:
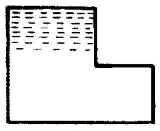
Figure 23C:
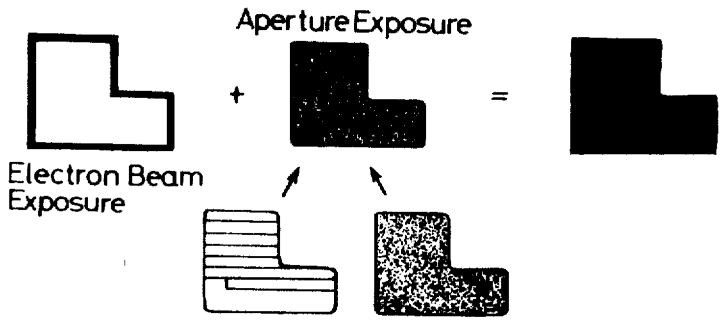

FIGS. 23A, 23B and 23C are diagrams for explaining exposure of predetermined patterns by employing electron beam exposure, the reducing lens exposure individually and both of these techniques in combination. FIG. 23A shows the case in which a desired master reticle is selected and the reducing lens exposure is used; FIG. 23B illustrates the case of the electron beam exposure; and FIG. 23C shows the case of using the electron beam exposure and the reducing lens exposure in combination. In FIG. 23A, a suitable master reticle is selected and exposure is effected and, in this case, corners are rounded. If no appropriate master reticle is found, exposure may be effected in a manner to combine more than two rectangles. In FIG. 23B, the peripheral area of the pattern is exposed and then the inner area is exposed, but since the beam spot is small, the time for scanning is long but the corners of the pattern are sharp. In FIG. 23C, the peripheral area of the pattern first is exposed and then an aperture of a suitable diameter is selected; the inner area is exposed by scanning or joining suitable patterns. In this case, the corners are sharp and the overall speed of exposure can be raised.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. Pattern generator apparatus for projecting from means for determining a pattern, a corresponding light image onto a sensitive surface, said apparatus comprising:

a. a light source;
b. means for disposing the pattern determining means into the path of said light source to provide a light image corresponding to the pattern; and
c. optical lens means including a varifocal lens for varying the degree of magnification of the light image and a reducing lens for directing and reducing the light image of varied magnification onto the sensitive surface whereby the surface is sensitized with a patterned image of reduced size with respect to the pattern of the pattern determining means.

2. Pattern generator apparatus as claimed in claim 1, wherein there further is included means for positioning the sensitized surface at the focal plane of said optical lens means.

3. Pattern generator apparatus as claimed in claim 1, wherein there further is included filter means disposed in the path of the light derived from said light source to provide light of one of the following ranges of wavelengths: h-ray, e-ray or g-ray.

4. Pattern generator apparatus for projecting from means for determining a pattern, a corresponding light image onto a sensitive surface, said apparatus comprising;

a light source;

means for disposing the pattern determining means into the path of said light source to provide a light image corresponding to the pattern;

optical lens means including a varifocal lens for varying the degree of magnification of the light image and a reducing lens for directing and reducing the light image of varied magnification onto the sensitive surface whereby the surface is sensitized with a patterned image of reduced size with respect to the pattern determining means; and focal position detecting means including first and second half mirrors disposed between said variable focal lens and said reducing lens, means for projecting a pattern onto said first half mirror whereby the projected pattern is reflected and refracted to be focused into an image on the sensitive surface, and means for receiving reflected light from said sensitive surface that is reflected and refracted by said second half mirror, measuring means responsive to and producing an output indicative of the projected pattern being in focus on the sensitive surface, said receiving means including condenser lens means for condensing the reflected and refracted light image onto said measuring means, and means for energizing said light source in response to an output indication of said measuring means that the projected patter is in focus on the sensitive surface.

5. Pattern generator apparatus as claimed in claim 4, wherein there is included means for vibrating the sensitive surface.

6. Pattern generator apparatus as claimed in claim 4, wherein there is included means for vibrating said measuring means.

7. Pattern generator apparatus as claimed in claim 4, wherein there is included means for vibrating with variable amplitude at least one of said variable focus lens and said reducing lens.

8. Pattern generator apparatus as claimed in claim 4, wherein the pattern determining means comprises a master reticle.

9. Pattern generator apparatus as claimed in claim 4, wherein the pattern determining means comprises means for forming variable apertures through which the light is directed.

10. Pattern generator apparatus as claimed in claim 8, wherein there is included means for supporting said master reticle comprising a plurality of first tables, each for receiving and supporting thereon a pattern of said master reticle and a second table for rotatably supporting said plurality of first tables, and means for selectively disposing one of the plurality of patterns as supported upon said first tables into the light path, comprising an indexing table rotatably coupled to said second table and means for rotating said first tables to select a predetermined position of the pattern.

11. Pattern generator apparatus as claimed in claim 10, wherein there is included means for simultaneously actuating said master reticle selecting means and said first table rotating means.

12. Pattern generator apparatus as claimed in claim 8, wherein there is included master reticle support means comprising a magazine for receiving a plurality of patterns of the master reticle, and there further is included means for selectively disposing said magazine so that the selected pattern may be extracted from said magazine and disposed at a position within the light path, and means for rotating the extracted, selected pattern.

13. Pattern generator apparatus as claimed in claim 9, wherein said variable aperture means comprises a plurality of adjustable diaphragm blades and electromagnetic means for actuating said plurality of diaphragm blades to provide a variable aperture through which the light image is directed.

14. Pattern generator apparatus as claimed in claim 4, wherein there is included a second light source and means for providing an aperture of variable configuration through which the light beam from said second light source is directed, and wherein said optical lens means includes prisms for directing the light images from said first-mentioned and said second light sources onto a condensing lens for directing the combined light images onto said variable focal length lens.

15. Pattern generator apparatus as claimed in claim 4, wherein there further is included means for forming and directing a beam of electrons onto the sensitized surface and means for selectively moving the beam of electrons to form a pattern on the sensitized surface whereby a composite pattern is formed by the electron beam and by the optical image derived from said optical lens means.

* * * * *